(12) United States Patent
Takenaka et al.

(10) Patent No.: US 8,032,921 B2
(45) Date of Patent: Oct. 4, 2011

(54) COMPUTER-READABLE RECORDING MEDIUM STORING ACCESS RIGHTS MANAGEMENT PROGRAM, ACCESS RIGHTS MANAGEMENT APPARATUS, AND ACCESS RIGHTS MANAGEMENT METHOD

(75) Inventors: Masahiko Takenaka, Kawasaki (JP); Souichi Okada, Kawasaki (JP); Takashi Yoshioka, Kawasaki (JP); Bintatsu Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1013 days.

(21) Appl. No.: 11/595,626

(22) Filed: Nov. 9, 2006

(65) Prior Publication Data
US 2008/0005779 A1    Jan. 3, 2008

(30) Foreign Application Priority Data
Jul. 3, 2006  (JP) .................................. 2006-183725

(51) Int. Cl.
*H04L 9/00*  (2006.01)
(52) U.S. Cl. ............................................... 726/1; 726/2
(58) Field of Classification Search .................. 713/153, 713/163, 183, 193, 340, 164; 726/2, 22, 726/26, 34, 17, 28, 29, 30, 31, 32, 33; 707/2, 707/200, 205, 202; 711/203, 217, 223, 237, 711/225, 229, 227
See application file for complete search history.

(56) References Cited

U.S. PATENT DOCUMENTS

| 2002/0116382 A1 | 8/2002 | Koyama et al. |
| 2006/0131397 A1* | 6/2006 | Reddy et al. .................. 235/380 |
| 2006/0265599 A1* | 11/2006 | Kanai .......................... 713/182 |

FOREIGN PATENT DOCUMENTS

| EP | 1 233 324 A2 | 8/2002 |
| JP | 07-093425 | 4/1995 |
| JP | 2001-034558 | 2/2001 |
| JP | 2001-167016 | 6/2001 |
| JP | 2002-244927 | 8/2002 |
| JP | 2003-203162 | 7/2003 |
| JP | 2006-99348 | 4/2006 |

OTHER PUBLICATIONS

Office Action issued by the Patent Office of Japan for corresponding Japanese Patent Application No. 2006-183725, issued Jul. 19, 2011 (with partial English language translation).

* cited by examiner

*Primary Examiner* — Vivek Srivastava
*Assistant Examiner* — Nega Woldemariam
(74) *Attorney, Agent, or Firm* — Greer, Burns & Crain, Ltd.

(57) ABSTRACT

A first access policy is stored to provide information on a first distributee to which an electronic document is distributed, to which the first distributee is permitted to distribute the electronic document, and use rights that permit the second distributees to use the electronic document. Also stored is a distribution target information indicating the second distributees. When the first distributee requests permission to grant use rights to a specific distributee, the distribution target is consulted to confirm whether or not the specific distributee is included in the second distributees. A second access policy associating the specific distributee with the information on the use rights is then registered. When the specific distributee requests permission to use the electronic document, the second access policy is consulted to permit the specific distributee to use the electronic document.

11 Claims, 30 Drawing Sheets

161 GROUP MANAGEMENT TABLE

| GROUP ID | GROUP ID OR USER ID |
|---|---|
| GROUP A | GROUP C |
| | GROUP D |
| GROUP B | USER a |
| | USER c |
| GROUP C | USER b |
| GROUP D | USER c |

FIG. 8

| DOCUMENT ID | SECRET KEY | USER ID OR GROUP ID | USE RIGHTS | | ACCESS POLICY-SETTING RIGHTS | |
|---|---|---|---|---|---|---|
| | | | READING RIGHT | PRINTING RIGHT | ACCESS POLICY SETTING | RIGHTS INFORMATION LINK |
| DOC0001 | *** | yamada | Yes | No | Yes | LINK00001 |

162 ACCESS POLICY MANAGEMENT TABLE

ACCESS POLICY (FIRST ACCESS POLICY)

FIG. 10

163 LINK ACCESS POLICY MANAGEMENT TABLE

| LINK ID | SETTABLE USE RIGHTS | | ACCESS POLICY-SETTING RIGHTS | NEXT LINK ID |
|---|---|---|---|---|
| | DEFINED-RANGE USER ID OR GROUP ID | READING RIGHT | PRINTING RIGHT | SETTABLE ACCESS POLICY-SETTING RIGHTS | |
| LINK00001 | eigyo1 | Yes | No | No | LINK00002 |

LINK ACCESS POLICY (FIRST ACCESS POLICY)

| DOCUMENT ID | USER ID OR GROUP ID | USE RIGHTS | | ACCESS POLICY-SETTING RIGHTS | |
| --- | --- | --- | --- | --- | --- |
| | | READING RIGHT | PRINTING RIGHT | ACCESS POLICY-SETTING RIGHTS | RIGHTS INFORMATION LINK |
| DOC0001 | yamada | Yes | Yes | Yes | LINK00001 |

| LINK ID | DEFINED-RANGE USER ID OR GROUP ID | SETTABLE USE RIGHTS | | ACCESS POLICY-SETTING RIGHTS | |
| --- | --- | --- | --- | --- | --- |
| | | READING RIGHT | PRINTING RIGHT | SETTABLE ACCESS POLICY-SETTING RIGHTS | NEXT LINK ID |
| LINK00001 | eigyo1 | Yes | No | No | Null |

| LINK ID | DEFINED-RANGE USER ID OR GROUP ID | SETTABLE USE RIGHTS | | ACCESS POLICY-SETTING RIGHTS | NEXT LINK ID |
|---|---|---|---|---|---|
| | | READING RIGHT | PRINTING RIGHT | SETTABLE ACCESS POLICY-SETTING RIGHTS | |
| DOC0001 | eigyo1 | Yes | No | No | - |

| LINK ID | DEFINED-RANGE USER ID OR GROUP ID | SETTABLE USE RIGHTS | | ACCESS POLICY-SETTING RIGHTS | NEXT LINK ID |
|---|---|---|---|---|---|
| | | READING RIGHT | PRINTING RIGHT | SETTABLE ACCESS POLICY-SETTING RIGHTS | |
| LINK00001 | eigyo1 | Yes | No | No | LINK00002 |
| LINK00002 | tanaka | Yes | No | No | Null |

COMPUTER-READABLE RECORDING MEDIUM STORING ACCESS RIGHTS MANAGEMENT PROGRAM, ACCESS RIGHTS MANAGEMENT APPARATUS, AND ACCESS RIGHTS MANAGEMENT METHOD

CROSS-REFERENCE TO RELATED APPLICATIONS

This application is based upon and claims the benefits of priority from the prior Japanese Patent Application No. 2006-183725 filed on Jul. 3, 2006, the entire contents of which are incorporated herein by reference.

BACKGROUND OF THE INVENTION

1. Field of the Invention

This invention relates to a computer-readable recording medium storing an access rights management program, an access rights management apparatus, and an access rights management method, and more particularly to a computer-readable recording medium storing an access rights management program for controlling access rights to an electronic document, an access rights management apparatus, and an access rights management method.

2. Description of the Related Art

In the case where a document author (hereinafter simply referred to as "the author") creates an electronic document using a computer and allows other users to read the electronic document, the electronic document is stored e.g. in a file server for shared access of the users to the electronic document to thereby easily allow the users to read the document.

To prevent leakage of such an electronic document to a third party, there have been proposed various methods of managing electronic documents (see e.g. Japanese Laid-Open Patent Publication Nos. 2001-167016 and 2002-244927). For example, as a basic method of managing electronic documents, a user-based (identity-based) management method is known in which policies as information indicative of conditions for access to electronic documents are controlled on a user-by-user basis. This method allows an author who intends to distribute an electronic document to set access conditions on a distributee-by-distributee basis, and is effective in managing use of electronic documents when applied to a relatively small-sized organization. When an organization is large in size or has a complicated hierarchical structure, however, the author has to carry out a complicated and troublesome operation.

Another known method is a role-based management method in which policies are managed according to roles or attributes of users. With this method, it is possible to set access conditions on a role-by-role basis or on an attribute-by-attribute basis, and policy management becomes possible for up to medium-sized organizations.

However, even when the role-based management method is employed, if an organization is large-sized or has a complicated hierarchical structure, the number of roles and attributes in policy management becomes enormous, which sometimes makes it impossible for an author to determine which policy to be used and makes his operation therefor very troublesome, resulting in the incapability of use and management of policies.

As described above, it is not easy for an author to finely specify distributees as intended within his authority for safe management of use of electronic documents.

On the other hand, in the case where electronic documents which are not policy-managed are distributed in an organization having a large size or a complicated hierarchical structure, an author of an electronic document trusts and permits a primary distributee (i.e. a person who receives the electronic document directly from the author) to perform secondary and tertiary distributions of the electronic document. This distribution method is noticeably used particularly in the distribution of electronic documents from a higher-ranked distributor to lower-ranked distributors.

However, when the distribution is repeatedly carried out in secondary and tertiary distributions or in even lower-order distributions, policies generated by the author or the primary distributee sometimes fail to be transferred to lower-ranked distributees. In such cases, policy management is loosened, and hence there is a fear that electronic documents might be leaked from lower-ranked or end distributees.

SUMMARY OF THE INVENTION

The present invention has been made in view of the above problems, and an object thereof is to provide a computer-readable recording medium storing an access rights management program which enables even a large-sized and hierarchical organization to safely manage use of electronic documents with ease and efficiency, an access rights management apparatus, and an access rights management method.

To attain the above object, in a first aspect of the present invention, there is provided a computer-readable recording medium storing an access rights management program for managing access rights to an electronic document. The access rights management program causes a computer to function as access policy-storing means for storing a first access policy containing information on a first distributee to which the electronic document is distributed, and information on second distributees, which is indicative of a range within which the first distributee is permitted to distribute the electronic document, as well as information on use rights that permit the second distributees to use the electronic document with a defined scope of authority, storage means for storing a distribution target indicative of the second distributees, access policy-confirming means operable when a distributee specifying request for permission to grant the use rights to a specific distributee is received from the first distributee, to refer to the distribution target to confirm whether or not the specific distributee is included in the second distributees, registration means operable when it is confirmed by the access policy-confirming means that the specific distributee is included in the second distributees, to register a second access policy associating the specific distributee with the information on the use rights, in the access policy-storing means, and use rights-confirming means operable when a use request for permission of use of the electronic document is received from the specific distributee, to refer to the second access policy to thereby permit the specific distributee to use the electronic document using the use rights.

To attain the above object, in a second aspect of the present invention, there is provided a method of managing access rights to an electronic document. This method comprises, in a state where a first access policy containing information on a first distributee to which the electronic document is distributed, and information on second distributees, which is indicative of a range within which the first distributee is permitted to distribute the electronic document, as well as information on use rights that permit the second distributees to use the electronic document with a defined scope of authority, is stored in access policy-storing means, and a distribution target indicative of the second distributees is stored in storage means, referring to the distribution target to confirm whether or not the specific distributee is included in the second distributees when a distributee specifying request for permission to grant the use rights to a specific distributee is received from the first distributee, registering a second access policy associating the specific distributee with the information on the use rights in the access policy-storing means when it is confirmed that the specific distributee is included in the second distributee, and referring to the second access policy to thereby permit the specific distributee to use the electronic document using the use rights when a use request for permission of use of the electronic document is received from the specific distributee.

To attain the above object, in a third aspect of the present invention, there is provided an access rights management apparatus for managing access rights to an electronic document. This access rights management apparatus comprises access policy-storing means for storing a first access policy containing information on a first distributee to which the electronic document is distributed, and information on second distributees, which is indicative of a range within which the first distributee is permitted to distribute the electronic document, as well as information on use rights that permit the second distributees to use the electronic document with a defined scope of authority, storage means for storing a distribution target indicative of the second distributees, access policy-confirming means operable when a distributee specifying request for permission to grant the use rights to a specific distributee is received from the first distributee, to refer to the distribution target to confirm whether or not the specific distributee is included in the second distributees, registration means operable when it is confirmed by the access policy-confirming means that the specific distributee is included in the second distributees, to register a second access policy associating the specific distributee with the information on the use rights, in the access policy-storing means, and use rights-confirming means operable when a use request for permission of use of the electronic document is received from the specific distributee, to refer to the second access policy to thereby permit the specific distributee to use the electronic document using the use rights.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 8 is a diagram of an example of the data structure of a group management table.
FIG. 10 is a diagram of an example of the data structure of an access policy management table.
FIG. 11 is a diagram of an example of the data structure of a link access policy management table.

FIG. 22A is a diagram of an access policy management table for illustrating an example of the present embodiment.
FIG. 22B is a diagram of a link access policy management table.
FIGS. 26A and 26B are diagrams useful in explaining the link access policy management table with a user added thereto.

DESCRIPTION OF THE PREFERRED EMBODIMENTS

The present invention will now be described in detail with reference to the accompanying drawings showing preferred embodiments thereof.

First, a description will be given of the outline of the present invention, and then the embodiments according to the present invention will be described in detail.

Figure 1:
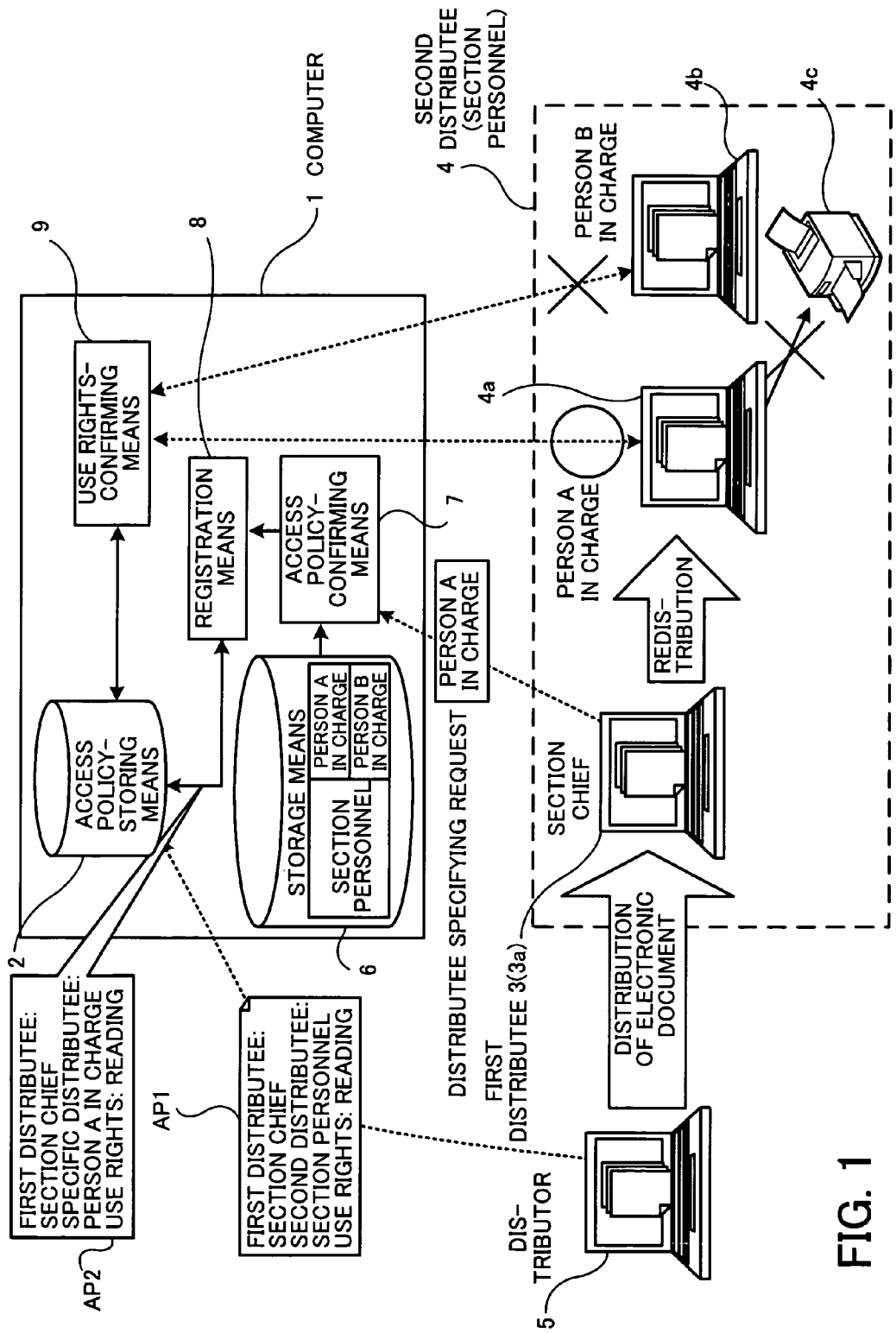
FIG. 1 is a diagram of the outline of the present invention.

FIG. 1 is a diagram of the outline of the present invention.

A computer 1 appearing in FIG. 1 functions as an access policy-storing means 2, a storage means 6, an access policy-confirming means 7, a registration means 8, and an use rights-confirming means 9.

The access policy-storing means 2 stores a first access policy AP1 containing information on a first distributee 3 to which an electronic document is distributed and information on a second distributee 4 indicative of a range within which the first distributee 3 is permitted to distribute the electronic document, as well as information on use rights that permit the second distributee 4 to use the electronic document with a defined scope of authority.

The first distributee 3 and the second distributee 4 may be computers which are logged-in by users or a plurality of computers forming a group, for example. In FIG. 1, a computer 3a used by the chief of a section (i.e. logged-in using the section chief's ID) corresponds to the first distributee 3, and computers 4a and 4b installed in the section and used by a person A in charge and a person B in charge, respectively, correspond to the second distributee 4.

The access policy AP1 is configured using a computer 5 by a distributor who distributes an electronic document to the first distributee 3.

The storage means 6 stores an (identifiable) distribution target indicative of a second distributee 4. In FIG. 1, the person A (person A's user ID) and the person B (person B's user ID) in the section are set as a distribution target.

When a distributee specifying request for permission to grant the use rights to a specific distributee is received from the first distributee 3, the access policy-confirming means 7 refers to the distribution target to confirm whether or not the specific distributee is included in the second distributee 4.

When the access policy-confirming means 7 confirms that the specific distributee is included in the second distributee 4, the registration means 8 registers a second access policy AP2 associating the specific distributee with information on the use rights in the access policy-storing means 2.

When a use request for permission of use of the electronic document is received from the specific distributee, the use rights-confirming means 9 refers to the second access policy AP2 to thereby permit the specific distributee to use the electronic document using the use rights.

The electronic document is distributed from the first distributee 3 to the specific distributee, e.g. by electronic mail.

Next, the effects of an access rights management program will be described with reference to FIG. 1.

When a distributee specifying request for permission to grant use rights to the person A is sent from the computer 3a used by a section chief to the computer 1, the access policy-confirming means 7 refers to the distribution target to confirm whether or not the person A is included in the section of the section chief. When the access policy-confirming means 7 confirms that the person A is included in the section, the second access policy AP2 associating the person A with information on use (reading) rights is registered in the access policy-storing means 2 by the registration means 8. Thereafter, when a use request is received from the person A, the use rights-confirming means 9 refers to the second access policy AP2 to permit the person A to use the electronic document within the scope of the use rights. The use rights granted to the person A here are only for reading, and the person A is not allowed to print the electronic document e.g. using a printer 4c.

Next, a detailed description will be given of a first embodiment of the present invention.

Figure 2:
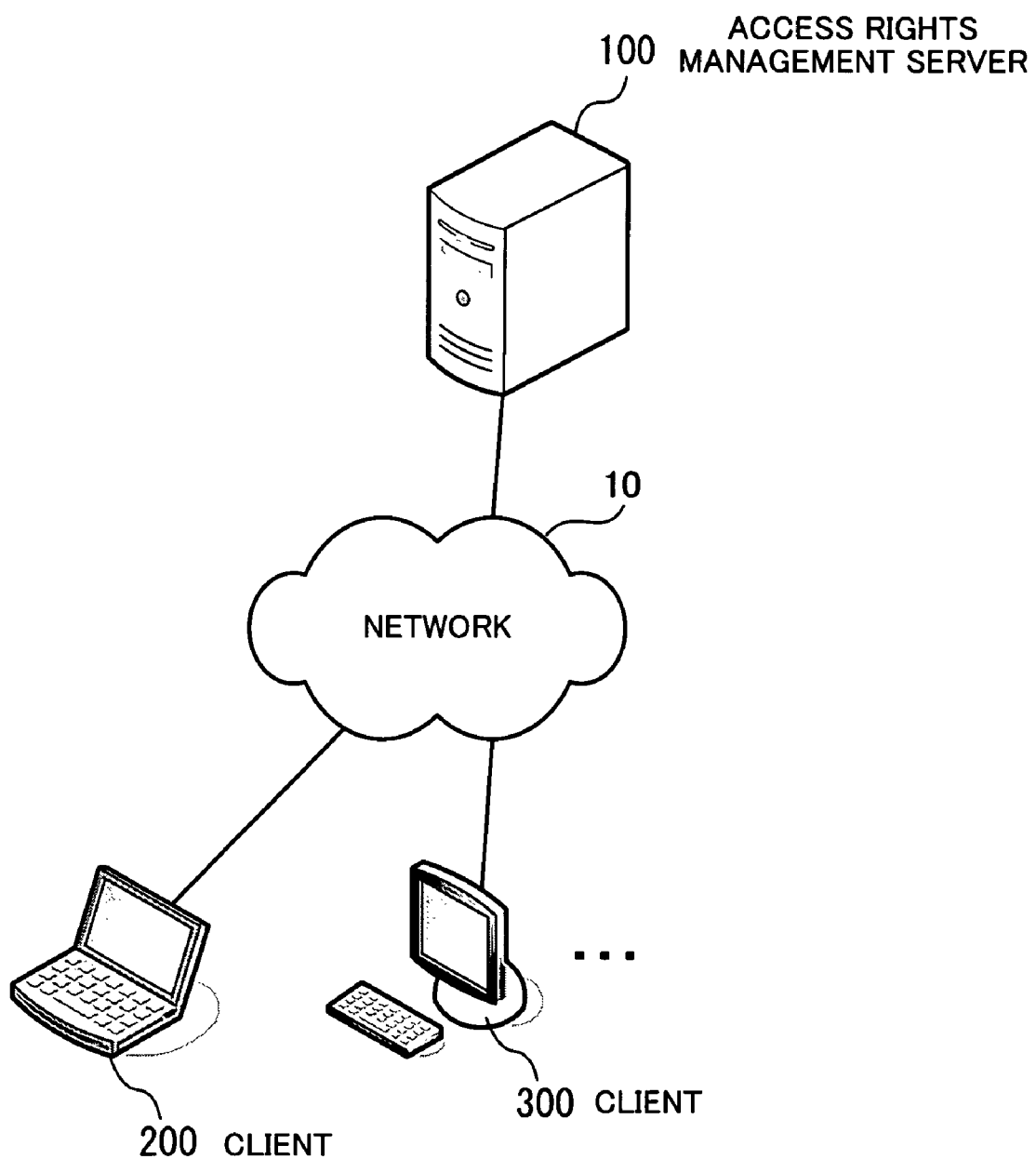
FIG. 2 is a diagram of an example of a system configuration of an embodiment of the present invention.

FIG. 2 is a diagram of an example of a system configuration of the first embodiment. In the present embodiment, a plurality of clients 200, 300, . . . are connected to an access rights management server 100 via a network 10.

The access rights management server 100 manages access policies associated with respective electronic documents delivered between the clients 200, 300, . . . . The clients 200, 300, . . . perform creation, distribution, reading (display), printing, etc. of electronic documents according to user commands.

In the following, a description will be given of the hardware configuration of the computers for realizing the above-described system.

Figure 3:
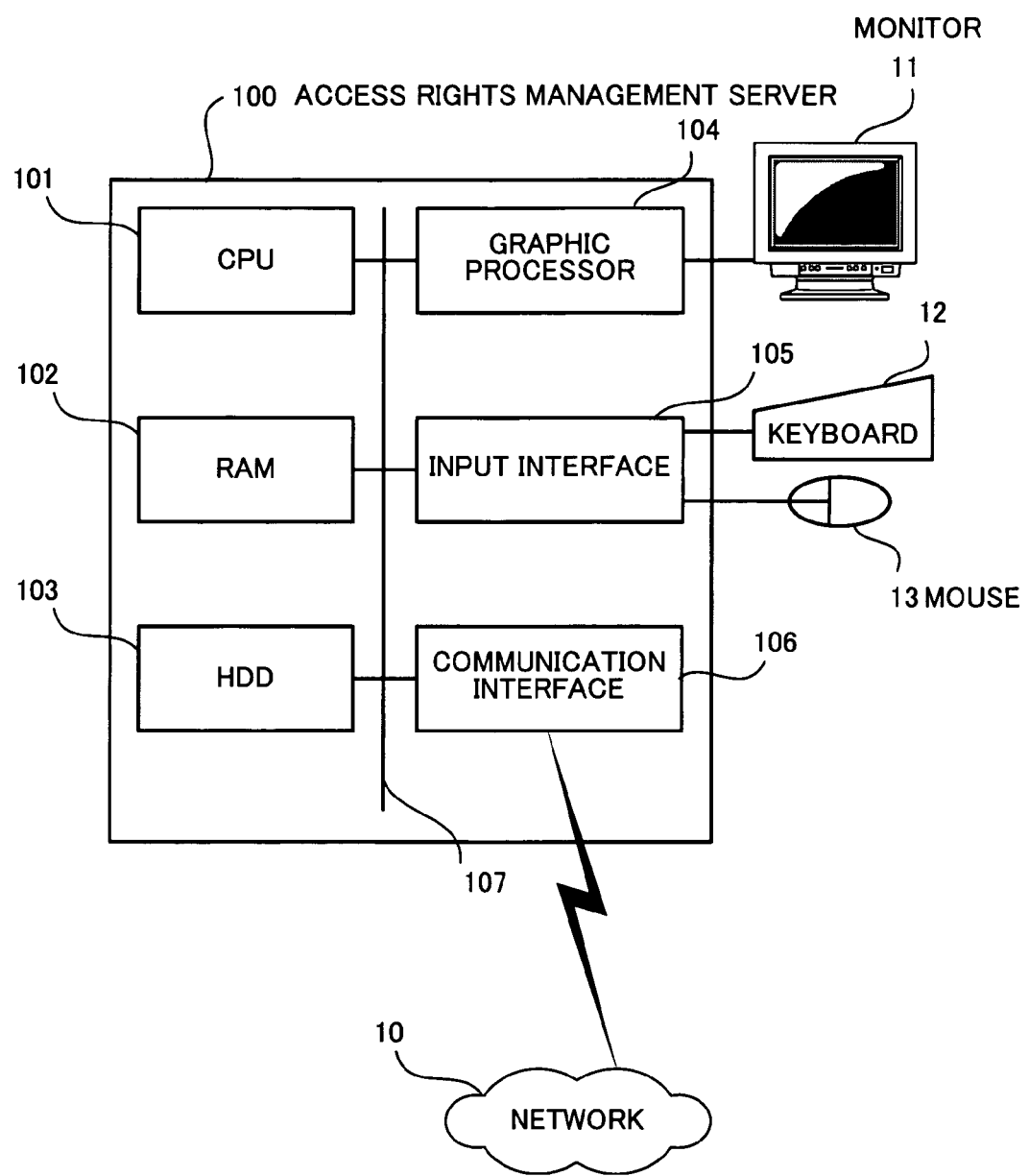
FIG. 3 is a diagram of an example of the hardware configuration of an access rights management server.

FIG. 3 is a diagram of an example of the hardware configuration of the access rights management server.

The access rights management server 100 has its overall operation controlled by a CPU (Central Processing Unit) 101. Connected to the CPU 101 are a RAM (Random Access Memory) 102, a hard disk drive (HDD: Hard Disk Drive) 103, a graphic processor 104, an input interface 105, and a communication interface 106, via a bus 107.

The RAM 102 temporarily stores at least part of an OS (Operating System) program and application programs executed by the CPU 101. Further, the RAM 102 stores various kinds of data required for processing by the CPU 101. The HDD 103 stores the OS program and the application programs. Further, the HDD 103 stores program files.

The graphic processor 104 is connected to a monitor 11. The graphic processor 104 displays images on the screen of the monitor 11 in response to commands from the CPU 101. A keyboard 12 and a mouse 13 are connected to the input interface 105. The input interface 105 sends signals input from the keyboard 12 and the mouse 13 to the CPU 101 via the bus 107.

The communication interface 106 is connected to the network 10. The communication interface 106 performs transmission and reception of data to and from other computers over the network 10.

The hardware configuration described above can realize the processing capabilities of the present embodiment. Although FIG. 3 shows the example of the hardware configuration of the server 100, the clients 200, 300, . . . can also be realized by the same hardware configuration.

Figure 4:
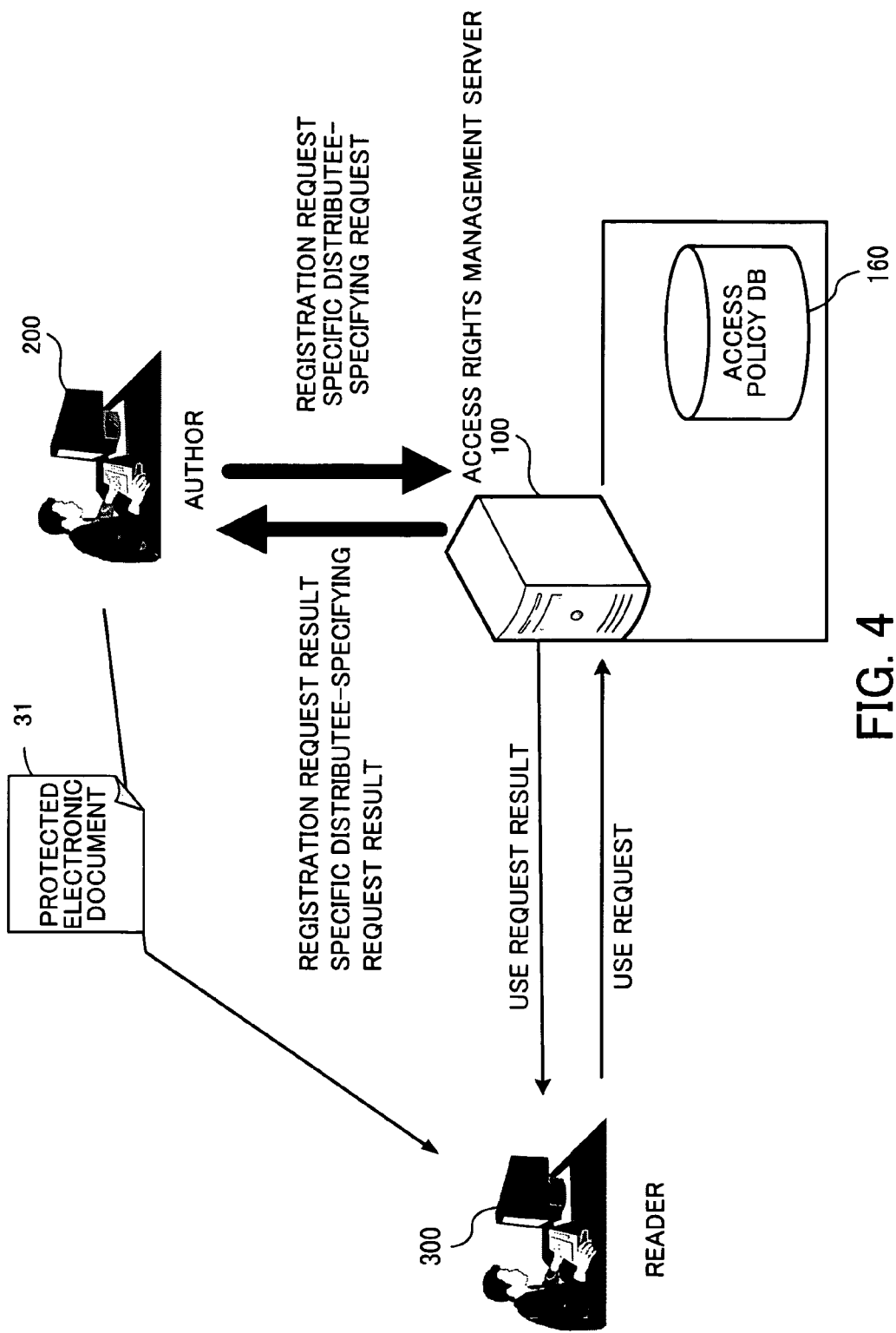
FIG. 4 is a schematic diagram of a process carried out by the present system.

FIG. 4 is a schematic diagram of a process carried out by the present system.

A user (author) who created an electronic document generates a protected electronic document 31 by encrypting an electronic document using the client 200, and transmits the protected electronic document 31 via the network 10. The client 300 used by a user (reader) can decrypt the protected electronic document 31 by receiving a key from the access rights management server 100. It should be noted that the protected electronic document 31 can be transmitted as a file attached to an electronic mail, for example.

In the case of distributing the protected electronic document 31, the author sets an access policy and the like for the electronic document using the client 200, and issues a registration request to the access rights management server 100. An access policy is information indicative of conditions for access to an electronic document. For example, a list of users permitted to read the electronic document is set in the access policy. More specifically, an access policy contains use rights information indicative of the scope of use rights with which an associated electronic document is allowed to be used, i.e. information indicative of whether or not reading of the electronic document, printing of the same, and so forth are permitted, and access policy-setting rights information indicative of the scope of rights with which use rights are allowed to be set.

When the access policy is set, the access rights management server 100 stores the contents of the set access policy in an access policy DB (database) 160. Then, the client 200 refers to a result of the registration request from the access rights management server 100, and if the registration is successful, the client 200 sends the protected electronic document 31 to the client 300.

When the reader requests the client 300 to use the protected electronic document 31, a use request for the protected electronic document 31 is issued from the client 300 to the access rights management server 100. The access rights management server 100 sends a use request result to the client 300 in response to the use request.

The client 300 refers to the use request result to thereby confirm that the reader is permitted to read the electronic document. As a consequence, the client 300 can decrypt the protected electronic document 31 and display the contents of the decrypted electronic document on a monitor.

Further, when the author requests specification of a specific distributee in an access policy and the like associated with the electronic document using the client 200, a specific distributee specification request is issued to the access rights management server 100.

When a specific distributee is specified, the access rights management server 100 stores the specified specific distributee in the access policy DB 160.

The access rights management server 100 and the clients 200 and 300 are provided with functions described below, so as to perform document access management in the system having the hardware configuration described hereinabove.

Figure 5:
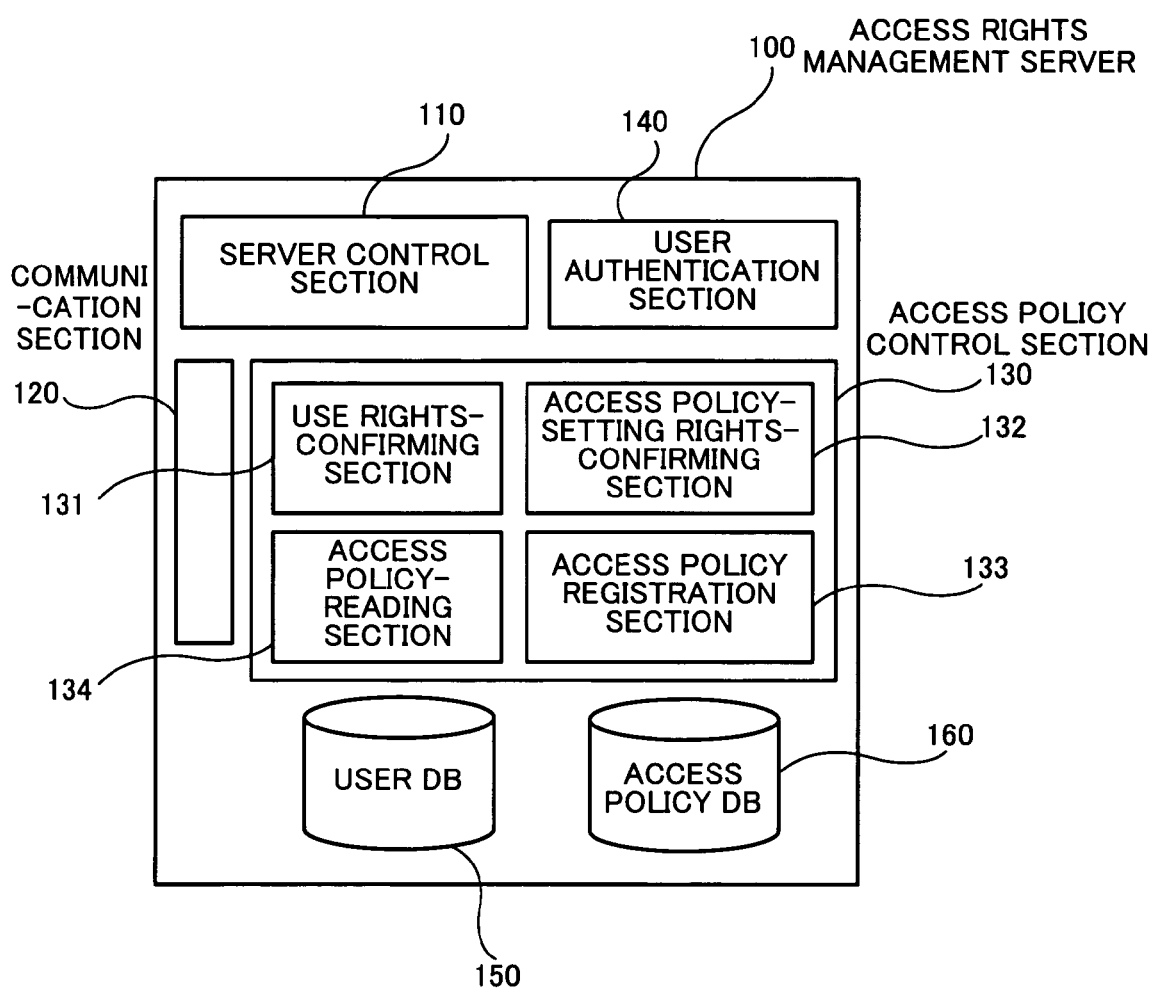
FIG. 5 is a block diagram of functions of the server.

FIG. 5 is a block diagram of the functions of the server.

The access rights management server 100 is comprised of a server control section 110, a communication section 120, an access policy control section 130, a user authentication section 140, a user DB 150, and the access policy DB 160.

The server control section 110 controls the operation of each section of the access rights management server 100. More specifically, the communication section 120, the access policy control section 130, and the user authentication section 140 each carry out a predetermined operation in response to an instruction from the server control section 110. Each of these sections then sends data (a received electronic document, generated data, an authentication result, a determination result, etc.) obtained through execution of the operation to the server control section 110. The server control section 110 sends new instructions to the other sections based on the result of execution of the operation.

The communication section 120 receives electronic documents from the clients 200, 300, . . . via the network 10, and transfers the received electronic documents to the server control section 110. Further, the communication section 120 receives data from the server control section 110, and transfers the received data to an associated one of the clients 200, 300, . . . via the network 10.

The access policy control section 130 is comprised of an use rights-confirming section 131, an access policy-setting rights-confirming section 132, an access policy registration section 133, and an access policy-reading section 134.

The use rights-confirming section 131 receives a user ID uniquely identifying a user and a document ID uniquely identifying an electronic document, and confirms, by referring to the access policy DB 160, whether or not the user using the user ID has use rights to the electronic document identified by the document ID.

The access policy-setting rights-confirming section 132 receives a document ID, and confirms whether or not the received document ID is registered in the access policy DB 160. Further, when receiving a document ID and a user ID, the access policy-setting rights-confirming section 132 confirms whether or not the user ID is granted access policy-setting rights in association with the document ID.

The access policy registration section 133 registers a received access policy and a received document ID in the access policy DB 160.

The access policy-reading section 134 reads out an access policy from the access policy DB 160 and delivers the same to the server control section 110.

The user authentication section 140 receives a user ID and an associated password, and refers to the user DB 150 to thereby perform authentication of the user ID and the password. More specifically, it is determined whether or not the user ID and the password are registered in the user DB 150, and only when the user ID is registered and the user ID and the password match with the registered data, the user ID and the password are authenticated.

The user DB 150 stores a plurality of user IDs and a plurality of passwords associated therewith.

Further, group IDs identifying respective groups to which users belong are stored in the user DB 150 in association with the users. For example, a part of a storage area of the HDD 103 is used as the user DB 150.

The access policy DB 160 stores access policies. For example, a part of a storage area of the HDD 103 is used as the access policy DB 160.

Figure 6:
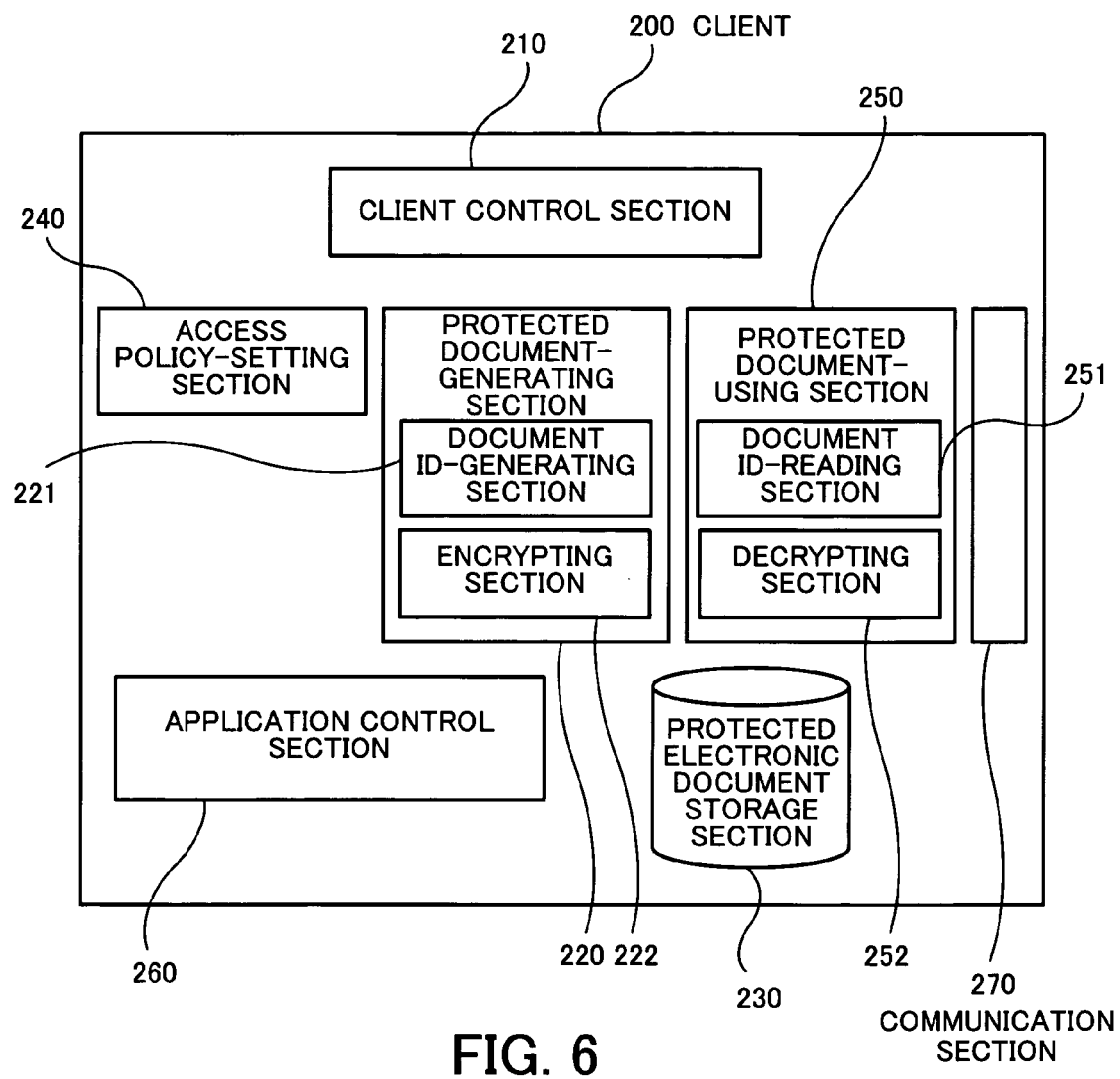
FIG. 6 is a block diagram of functions of a client.

FIG. 6 is a block diagram of the functions of a client.

The client 200 is comprised of a client control section 210, a protected document-generating section 220, a protected electronic document storage section 230, an access policy-setting section 240, a protected document-using section 250, an application control section 260, and a communication section 270.

The client control section 210 controls the operation of each section of the client 200 similarly to the server control section 110.

The protected document-generating section 220 has a function of generating an electronic document to be distributed to other users. The protected document-generating section 220 is formed e.g. by a word processor.

The protected document-generating section 220 is comprised of a document ID-generating section 221 and an encrypting section 222.

The document ID-generating section 221 generates document IDs.

The encrypting section 222 encrypts an electronic document and adds a document ID generated by the document ID-generating section 221 to the encrypted electronic document to thereby generate a protected electronic document. The encryption is performed using a secret key decryptable by a protected document-using section 350 of the client 300 as a distributee of the electronic document (for example, the secret key is a public key corresponding to a secret key of the client 300). The secret key may be generated by the encrypting section 222, or provided in advance in the encrypting section 222.

The protected electronic document storage section 230 stores protected electronic documents generated by the encrypting section 222. For example, a part of a storage area of a RAM provided in the client 200 is used as the protected electronic document storage section 230.

The access policy-setting section 240 has a GUI (Graphical User Interface), and displays an access policy-setting screen for setting an access policy, on a monitor in response to user input.

The protected document-using section 250 is comprised of a document ID-reading section 251 and a decrypting section 252.

The document ID-reading section 251 reads out a document ID from a protected electronic document.

The decrypting section 252 receives a secret key and decrypts an encrypted electronic document.

The application control section 260 has a function of determining the scope of use rights granted by the access rights management server 100. When receiving an electronic document, the application control section 260 starts using the electronic document within a range delimited by the use rights. For example, if the reading right included in the use rights is granted, the contents of the received electronic document are displayed on the monitor.

The communication section 270 transfers a protected electronic document generated by the protected document-generating section 220 to the client 300 via the network 10. For example, the communication section 270 sends the protected electronic document as a file attached to an electronic mail to the client 300. Further, the communication section 270 receives a protected electronic document sent from the client 300 via the network 10.

Although not shown, the client 300 is also comprised of a client control section 310, a protected document-generating section 320, a protected electronic document storage section 330, an access policy-setting section 340, the protected document-using section 350, an application control section 360, and a communication section 370, which have the same functions, respectively, as the client control section 210, the protected document-generating section 220, the protected electronic document storage section 230, the access policy-setting section 240, the protected document-using section 250, the application control section 260, and the communication section 270 of the client 200.

Next, a detailed description will be given of the contents of the user DB 150. The user DB 150 stores user IDs and passwords in the form of a table.

Figure 7:
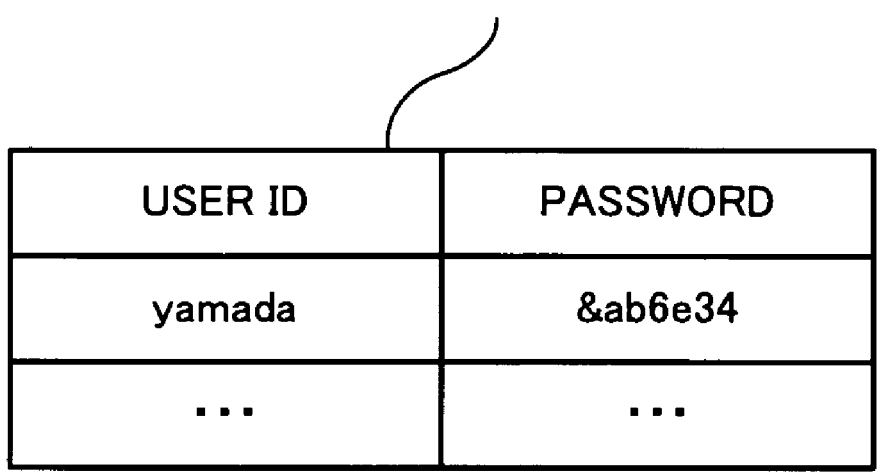
FIG. 7 is a diagram of an example of the data structure of a user management table.

FIG. 7 is a diagram of an example of the data structure of a user management table.

The user management table 151 has a "user ID" column and a "password" column, and information items arranged laterally in the table are associated with each other.

In the "user ID" column are set user IDs indicative of respective users permitted to be connected to the access rights management server 100 (i.e. user IDs to be managed).

In the "password" column are set passwords associated with the respective user IDs.

Next, a detailed description will be given of the contents of the access policy DB 160. The access policy DB 160 stores a group management table showing the association between each user and a group to which the user belongs, and an access policy management table and a link access policy management table which are related to configuration of each access policy.

FIG. 8 is a diagram of an example of the data structure of the group management table.

The group management table 161 has a "group ID" column and a "group ID or user ID" column, and information items arranged laterally in the table are associated with each other.

In the "group ID" column are set group IDs to be managed.

In the "group ID or user ID" column are set group IDs of groups subordinate to each group set in the "group ID" column, or respective user IDs of users belonging to the group set in the "group ID" column.

FIG. 8 shows that a "group C" and a "group D" each belong to a "group A". Further, a user b belongs to the "group C", and a user c belongs to the "group D". A user a and the user c belong to a "group B".

Figure 9:
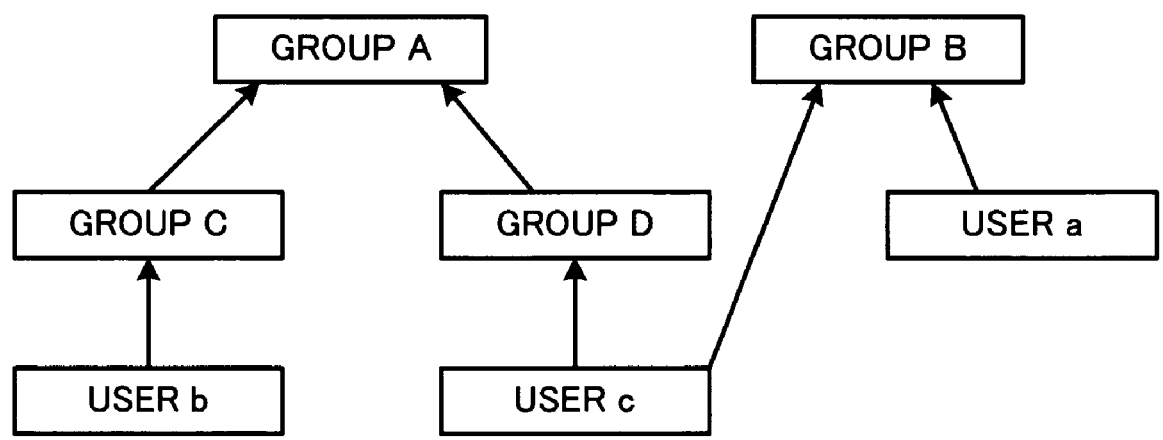
FIG. 9 is a diagram of the relationship between groups appearing in FIG. 8.

FIG. 9 is a diagram of the relationship between the groups appearing in FIG. 8.

As shown in FIG. 9, each user belongs to one or more groups. The parent-child relationship between the groups is configured not to form a loop.

FIG. 10 is a diagram of an example of the data structure of the access policy management table.

In the access policy management table are set data items associated with a primary distributee.

The access policy management table 162 has a "document ID" column, a "secret key" column, a "user ID or group ID" column, an "use rights" column, and an "access policy-setting rights" column, and information items arranged laterally in the table are associated with each other. Further, the "use rights" column is divided into a "reading right" column and a "printing right" column which show the details of the access right. The "access policy-setting rights" column is comprised of an "access policy setting" column and a "rights information link" column.

In a field of the "document ID" column is set a document ID generated by the document ID-generating section 221.

In a field of the "secret key" column is set a secret key used when an electronic document is encrypted by the encrypting section 222.

In a field of the "user ID or group ID" column is set a group ID or the user ID of a primary distributee.

In a field of the "reading right" column is set "yes" or "no" which is indicative of whether or not a user having the user ID or a group having the group ID set in the "user ID or group ID" column (hereinafter simply referred to as "the set user" or "the set group", respectively) is permitted to read an electronic document associated with the document ID set in the "document ID" column (hereinafter simply referred to as "the set document ID").

In a field of the "printing right" column is set "yes" or "no" which is indicative of whether or not the set user or set group is permitted to print the electronic document associated with the set document ID.

In the present embodiment, the use rights include the reading right and the printing right as described above, so that when only the reading right is granted to a set user or a set group, reading is permitted, but printing is not, as described hereinbefore. When the reading right and the printing right are both granted to a set user or a set group, not only reading but also printing is permitted.

In a field of the "access policy setting" column is set "yes" or "no" which is indicative of whether or not the set user or the set group is permitted to set an access policy concerning the electronic document corresponding to the set document ID to a secondary distributee (second distributee).

Information on the secondary distributee is set in the link access policy management table.

In a field of the "rights information link" column is set a link ID to the link access policy management table.

FIG. 10 shows that a user having a user ID "yamada" is granted use rights and the access policy-setting rights in association with an electronic document assigned a document ID "DOC0001" (i.e. the user is permitted to use the electronic document and set an access policy). More specifically, the user having the user ID "yamada" is permitted to only read the electronic document assigned the document ID "DOC0001", but not to print the same. Further, according to the access policy-setting rights granted to the user, the user is permitted to set an access policy for a secondary distributee registered in a link access policy management table having a link name "LINK00001".

In FIG. 10, the data items set in the "user ID or group ID" field, the "use rights" field, and the "access policy-setting rights" field, respectively, constitute the access policy set to the primary distributee.

FIG. 11 is a diagram of an example of the data structure of the link access policy management table.

In the link access policy management table 163 are set data items which a primary distributee is permitted to set to secondary distributees.

The link access policy management table 163 has a "link ID" column, a "defined-range user ID or group ID" column, a "settable use rights" column, a "settable access policy-setting rights" column, and a "next link ID" column, and information items arranged laterally in the table are associated with each other.

In a field of the "link ID" column is set a link name associated with the link name set in the "rights information link" field of the access policy management table 162.

In a field of the "defined-range user ID or group ID" column is set a user ID or a group ID assigned to the secondary distributee.

The "settable use rights" column is divided into a "reading right" column and a "printing right" column similarly to the "use rights" column of the access policy management table 162. The details of the use rights are the same as those in the access policy management table 162, and therefore description thereof is omitted.

In a field of the "settable access policy-setting rights" column is set "yes" or "no" which is indicative of whether or not the secondary distributee is permitted to set an access policy for a tertiary distributee. If no tertiary distributee exists, "no" is set in the field.

In a field of the "next link ID" column is set a link ID when another link access policy is present. When no other link access policy is present, "Null" is set in the field. For example, when an author sets a chief of a first sales section to a primary distributee of an electronic document, sets a link access policy for the first sales section as a secondary distributee, and further sets a link access policy for a second sales section, "LINK00002" is set in the "next link ID" field of the link access policy for the first sales section. In this case, in the link access policy management table 163 are registered a link access policy with "LINK00001" set in the "link ID" field and a group ID of the first sales section set in the "defined-range user ID or group ID" field, and a link access policy with "LINK00002" set in the "link ID" field and a group ID of the second sales section set in the "defined-range user ID or group ID" field.

In FIG. 11, the data items set in the "defined-range user ID or group ID" field, the "settable use rights" field, and the "access policy-setting rights" field, respectively, constitute the link access policy.

Further, the access policy and the link access policy constitute the first access policy.

As described above, the access rights management server 100 manages access policies using the access policy management table 162 and the link access policy management table 163. An author can set new link access policies in the link access policy management table 163 to thereby set access policies for a plurality of secondary distributees. Further, in the case, not shown, where a tertiary or upper-ranked distributee exists, it is possible to easily set an access policy for the distributee e.g. by generating a new link access policy management table.

Although in FIGS. 10 and 11, the use rights include only the reading right and the printing right, this is not limitative, but the use rights may be configured to also include a storing right or the like to store an electronic document by another name.

Hereafter, the term "access policy setting" is simply used, it represents setting of an access policy and a link access policy.

In the case of distributing a protected electronic document, the author causes the client 200 to carry out a process for creating the protected electronic document from an electronic document and registering an access policy in the access rights management server 100 (hereinafter the process will be referred to as "the creation and registration process"). To cause the client 200 to carry out the creation and registration process, the author sends a setting request to the client control section 210 by operating the keyboard or the like. When receiving the setting request, the client control section 210 transfers the setting request to the access policy-setting section 240. The access policy-setting section 240 starts an access policy-setting screen on the monitor connected to the client 200. The author sets an access policy by carrying out setting operations using the keyboard and the mouse while viewing the access policy-setting screen.

Figure 12:
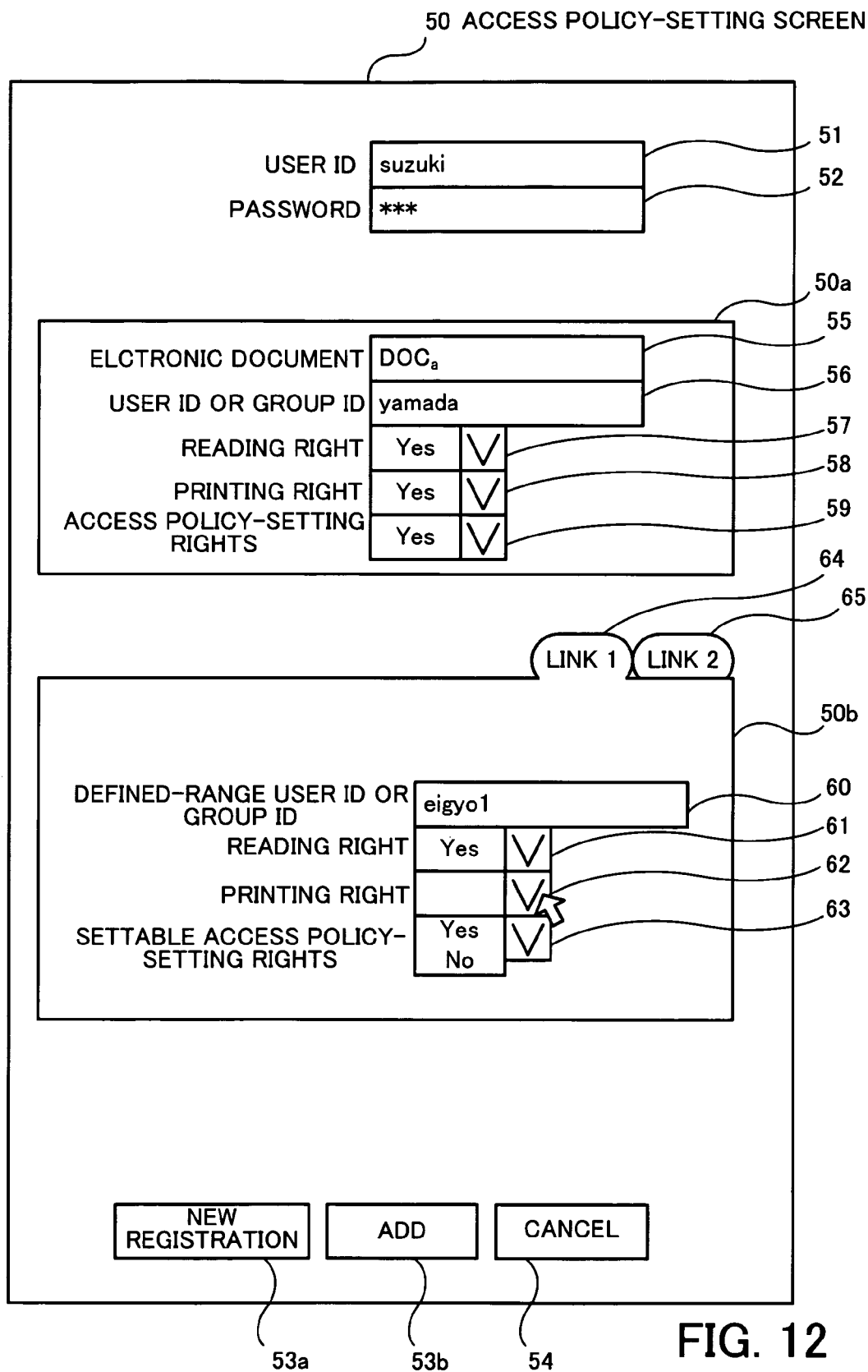
FIG. 12 is a view of an access policy-setting screen.

FIG. 12 is a view of the access policy-setting screen.

The access policy-setting screen 50 is comprised of an access policy entry section 50a in which an access policy is entered, a link access policy entry section 50b in which a link access policy is entered, an entry field 51 for entering the user ID of an author, an entry field 52 for entering a password, a "new registration" button 53a, an "add" button 53b, and a "cancel" button 54.

The access policy entry section 50a is comprised of an entry field 55 in which an electronic document desired to be distributed is entered, an entry field 56 in which the user ID or group ID of a primary distributee is entered, a selection field 57 for selecting whether or not to grant the reading right, a selection field 58 for selecting whether or not to grant the printing right, and a selection field 59 for selecting whether or not to grant the access policy-setting rights. Whether or not to grant the reading right, the printing right, and the access policy-setting rights can be selected by clicking check boxes provided in the respective selection fields, using the mouse or the like.

The link access policy entry section 50b is comprised of an entry field 60 in which a defined-range user ID or a defined-range group ID assigned to a secondary distributee is entered, a selection field 61 for selecting whether or not to grant the reading right, a selection field 62 for selecting whether or not to grant the printing right, and a selection field 63 for selecting whether or not to grant the settable access policy-setting rights.

Further, the link access policy entry section 50b is provided with tabs (two tabs 64 and 65 shown in FIG. 12) for switching between access policies when there are a plurality of link access policies to be created.

The author enters necessary data items in the respective entry fields and selects items in the respective selection fields, as required. Then, when the author presses the "new registration" button 53a, the creation and registration process is started. More specifically, the access policy-setting section 240 sends finally determined information to the client control section 210, and the client control section 210 gives instructions to the respective relevant sections.

On the other hand, when the user presses the "cancel" button 54, the access policy-setting section 240 closes the access policy-setting screen 50. In this case, the creation and registration process is not executed.

Next, a description will be given of the creation and registration process.

Figure 13:
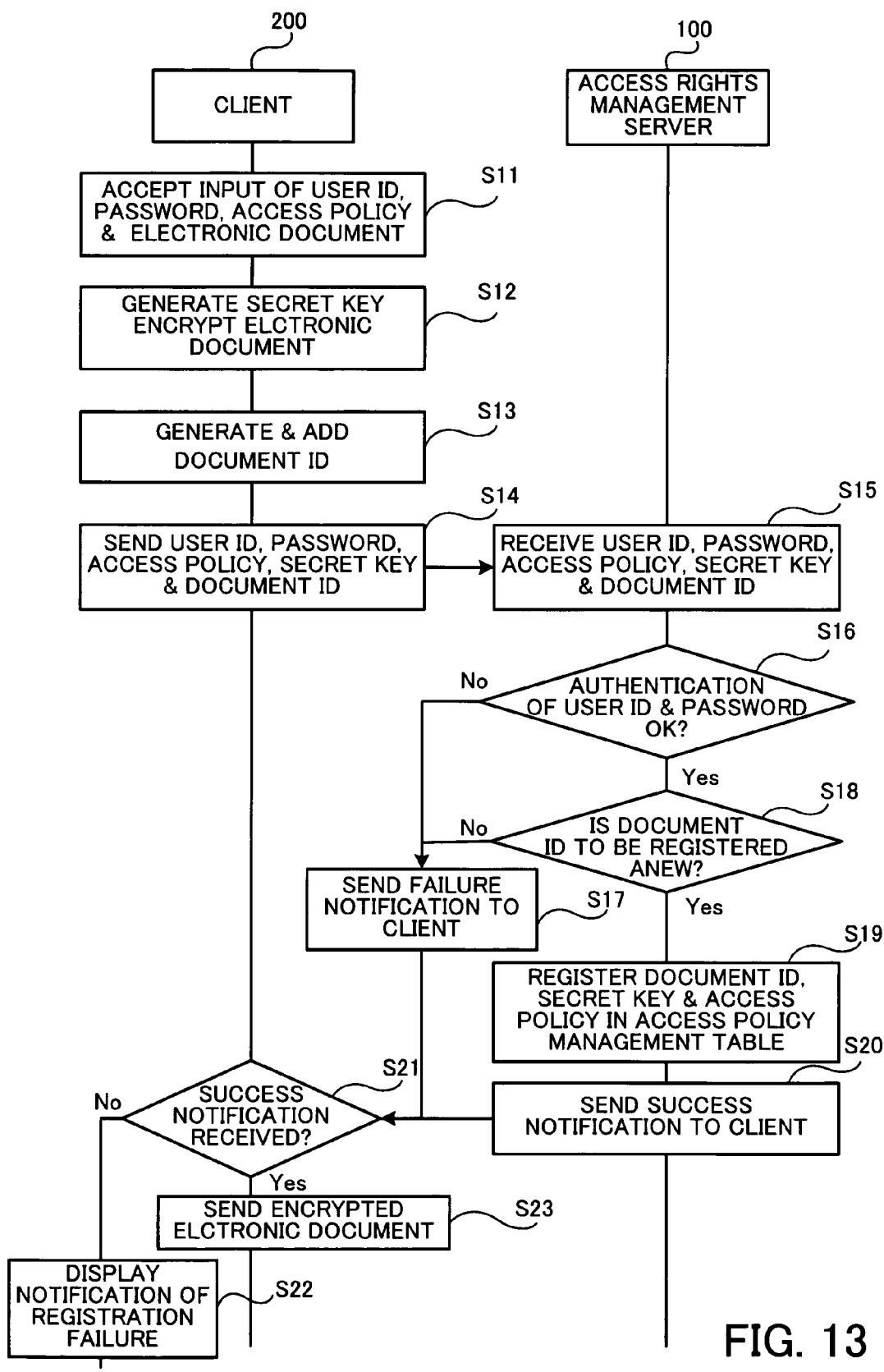
FIG. 13 is a flowchart of a creation and registration process.

FIG. 13 is a flowchart of the creation and registration process.

First, the client control section 210 accepts from an author (user A) an operating input giving an instruction for creating a protected electronic document. More specifically, when the "new registration" button 53a is pressed by the user A, the client control section 210 accepts the entries of the user A's user ID "$UID_A$" and password "$PWD_A$", the user A's (first) access policy "$AP_a$", and an electronic document "$Doc_a$" (step S11).

Then, the client control section 210 transfers the electronic document "$Doc_a$" to the protected document-generating section 220. When receiving the electronic document "$Doc_a$", the encrypting section 222 generates a secret key "$Key_a$" for the electronic document "$Doc_a$". Then, the encrypting section 222 encrypts the electronic document "$Doc_a$" using the generated secret key "$Key_a$" (step S12), to thereby generate an intermediate electronic document "$E[Key_a, Doc_a]$".

Next, the document ID-generating section 221 generates a document ID "$DID_a$", and the document ID "$DID_a$" is added to the intermediate electronic document "$E[Key_a, Doc_a]$", whereby a protected electronic document "$EDoc_a$" is generated (step S13). The generated protected electronic document "$EDoc_a$" is stored in the protected electronic document storage section 230.

Then, the client control section 210 sends the user ID "$UID_A$", the password "$PWD_A$", the access policy "$AP_a$", the secret key "$Key_a$", and the document ID "$DID_a$" to the access rights management server 100, as a registration request (step S14).

When the communication section 120 of the access rights management server 100 receives these information items (step S15), the server control section 110 transfers the user ID "$UID_A$" and the password "$PWD_A$" to the user authentication section 140.

Then, the user authentication section 140 checks the user ID "$UID_A$" and the password "$PWD_A$" for authentication (step S16).

If the user ID "$UID_A$" and the password "$PWD_A$" are not authenticated (NO to the step S16), the communication section 120 sends a failure notification (i.e. a result of the registration request) to the client 200 (step S17).

On the other hand, if the user ID "$UID_A$" and the password "$PWD_A$" are authenticated (YES to the step S16), the access policy-setting rights-confirming section 132 confirms whether or not the document ID "$DID_a$" is to be newly registered (step S18). More specifically, it is determined whether or not the document ID "$DID_a$" is present in the access policy management table 162 and the link access policy management table 163.

If the document ID "$DID_a$" is not to be newly registered (NO to the step S18), the communication section 120 sends a failure notification to the client 200.

If the document ID "$DID_a$" is to be newly registered (YES to the step S18), the access policy registration section 133 registers the document ID "$DID_a$", the secret key "$Key_a$", and a primary distributee's access policy of the access policy "$AP_a$" in the access policy management table 162. During this processing, a link ID is generated in the "rights information link" column, and the same link ID generated in the access policy management table 162 and a secondary distributee's access policy are set in the link access policy management table 163 (step S19).

Thereafter, the communication section 120 sends a success notification (i.e. a result of the registration request) to the client 200 to indicate that the registration is successful (step S20).

If the communication section 270 of the client 200 receives the failure notification (NO to the step S21), the client control section 210 displays a notification screen indicative of registration failure on the monitor, for example (step S22).

If the communication section 270 receives the success notification (YES to the step S21), after confirming the success notification, the client control section 210 takes out the protected electronic document "$EDoc_a$" from the protected electronic document storage section 230. Thereafter, the client control section 210 starts e.g. an electronic mail application to thereby attach the protected electronic document "$EDoc_a$" as an attached file to an electronic mail. When the user A enters the primary distributee's mail address and so forth, and presses a "send" button, the communication section 270 sends the electronic mail to the client 300 (step S23).

This completes the creation and registration process.

Figure 14:
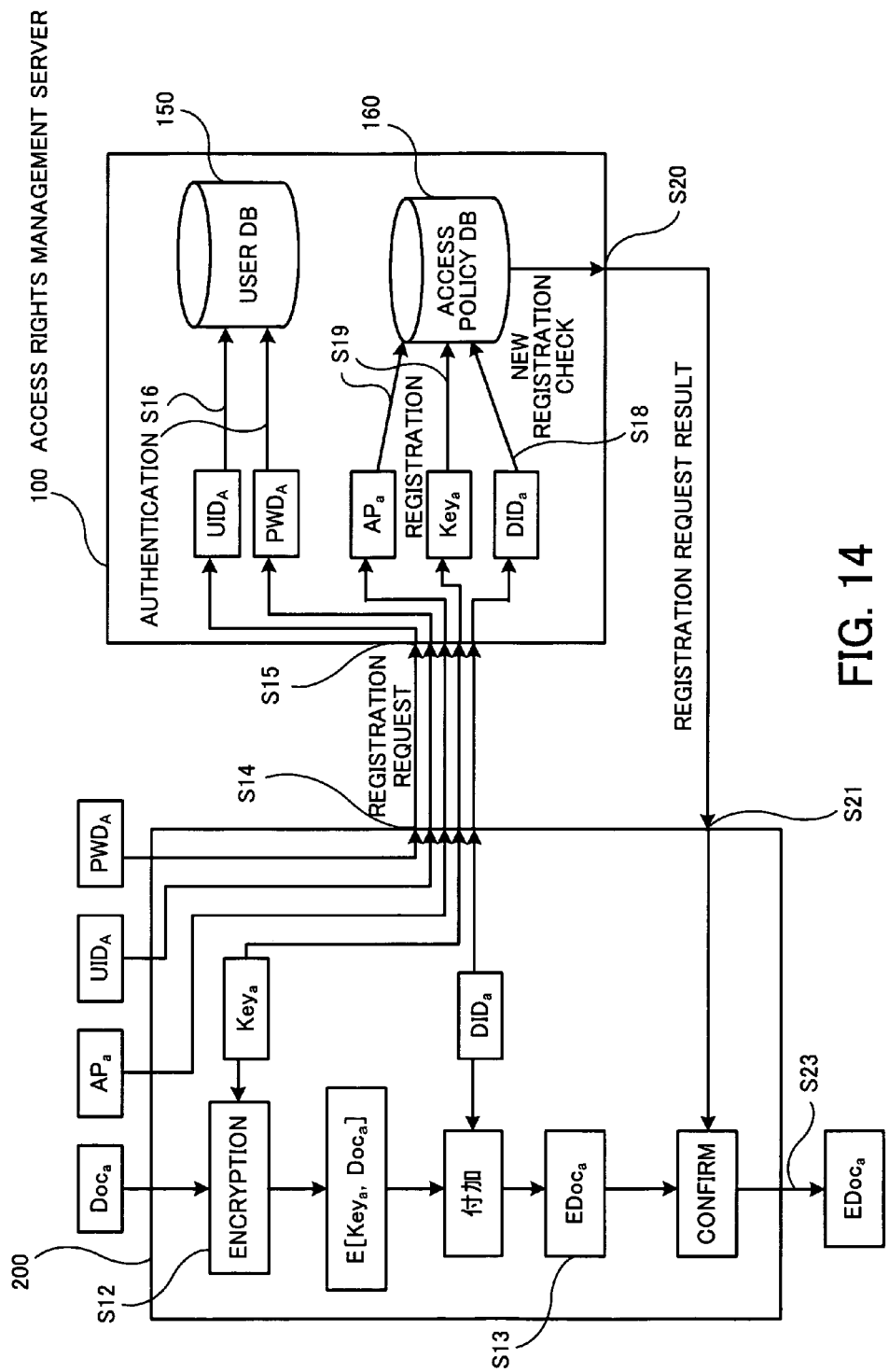
FIG. 14 is a diagram of the outline of the creation and registration process.

FIG. 14 is a diagram of the outline of the creation and registration process.

Steps in FIG. 14 correspond to the respective steps of the flowchart shown in FIG. 13.

Although in the present embodiment, the access policy "$AP_a$" is entered simultaneously with the user ID "$UID_A$", the password "$PWD_A$", and the electronic document "$Doc_a$", this is not limitative, but the access policy "$AP_a$" may be set in advance in the access policy management table 162 and the link access policy management table 163, and then the user ID "$UID_A$", the password "$PWD_A$", and the electronic document "$Doc_a$" may be entered.

In order to use the protected electronic document "$EDoc_a$", the primary distributee causes the client 300 to carry out a use process for obtaining use permission from the access rights management server 100. To start the use process, the primary distributee sends a use request to the client control section 310 by operating the keyboard or the like. When receiving the use request, the client control section 310 transfers the same to the protected document-using section 350. The protected document-using section 350 starts a protected document use screen on the monitor connected to the client 300.

Figure 15:
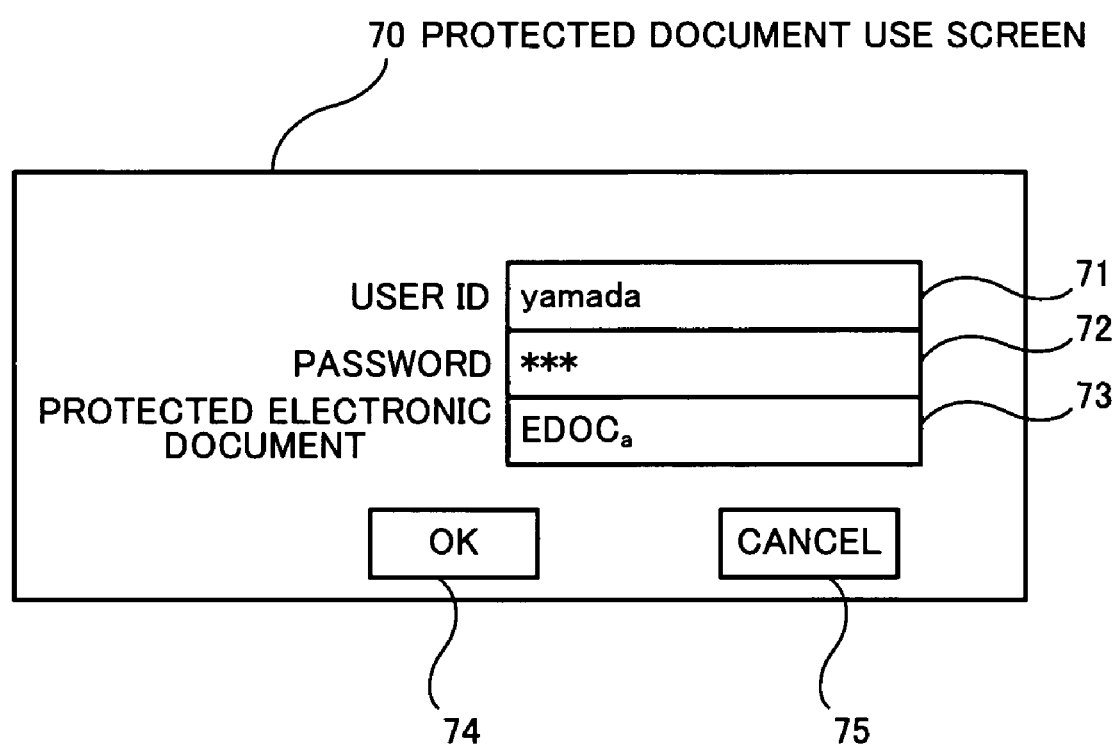
FIG. 15 is a view of a protected document use screen.

FIG. 15 is a view of the protected document use screen.

The protected document use screen 70 is comprised of an entry field 71 for entering the user ID of a user who desires to use a protected electronic document, an entry field 72 for entering the password of the user, an entry field 73 for entering the name of the electronic document to be used, an "OK" button 74, and a "cancel" button 75.

When the user enters necessary data items in the respective entry fields and presses the "OK" button 74, the use process is started. More specifically, the protected document-using section 350 sends finally determined information to the client control section 310, and the client control section 310 gives instructions to the respective relevant sections.

Next, the use process will be described by taking an example of the case where the protected electronic document "EDoca" created by the client 200 is used by the primary distributee (user B).

Figure 16:
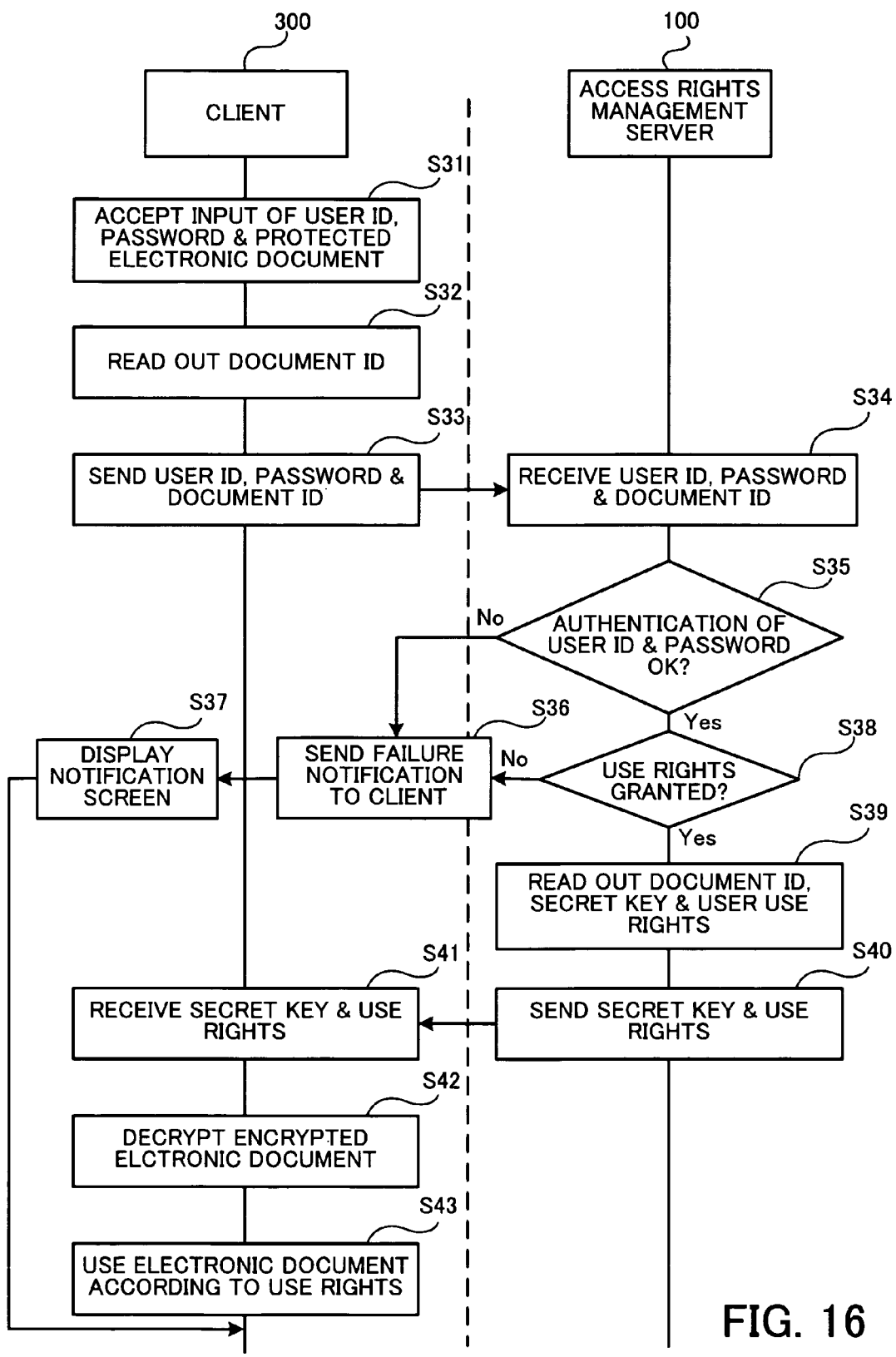
FIG. 16 is a flowchart of a use process.

FIG. 16 is a flowchart of the use process.

First, the protected document-using section 350 accepts a user B's operating input giving an instruction for using the protected electronic document. More specifically, when the "OK" button 74 is pressed by the user B, the protected document-using section 350 accepts input of a user ID "$UID_B$", a password "$PWD_B$", and the protected electronic document "$EDoc_a$" which are entered on the protected document use screen 70 (step S31).

Next, a document ID-reading section 351 reads out the document ID "$DID_a$" (step S32).

Then, the communication section 370 sends the user ID "$UID_B$", the password "$PWD_B$", and the document ID "$DID_a$" to the access rights management server 100, as a use request (step S33).

When the communication section 120 of the access rights management server 100 receives these information items (step S34), the server control section 110 transfers the user ID "$UID_B$" and the password "$PWD_B$" to the user authentication section 140.

Then, the user authentication section 140 checks the user ID "$UID_B$" and the password "$PWD_B$" for authentication (step S35).

If the user ID "$UID_B$" and the password "$PWD_B$" are not authenticated (NO to the step S35), the communication section 120 sends a failure notification (i.e. a result of the use request) to the client 300 (step S36). Then, the client control section 310 displays a notification screen indicative of access failure on the monitor, for example (step S37), followed by terminating the use process.

On the other hand, if the user ID "$UID_B$" and the password "$PWD_B$" are authenticated (YES to the step S35), the use rights-confirming section 131 refers to the access policy management table 162 and the link access policy management table 163 to thereby confirm whether or not the user having the user ID "$UID_B$" is granted use rights "$U_{aB}$" to the electronic document having the document ID "$DID_a$" (step S38).

If the user is not granted the use rights "$U_{aB}$" (NO to the step S38), the steps S36 et seq. are executed.

On the other hand, if the user is granted the use rights "$U_{aB}$" (YES to the step S38), the access policy-reading section 134 reads out the use rights "$U_{aB}$" and the secret key "$Key_a$" from the access policy management table 162 (step S39).

Next, the communication section 120 sends the use rights "$U_{aB}$" and the secret key "$Key_a$" to the client 300, as a result of the use request (step S40).

When the communication section 370 of the client 300 receives the use rights "$U_{aB}$" and the secret key "$Key_a$" (step S41), a decrypting section 352 decrypts the protected electronic document "$E[Key_a, Doc_a]$" using the received secret key "$Key_a$" (step S42). Thereafter, the client control section 310 delivers the electronic document "$Doc_a$" to the application control section 360.

Then, the application control section 360 starts using the electronic document "$Doc_a$" according to the use rights (step S43).

This completes the use process.

Figure 17:
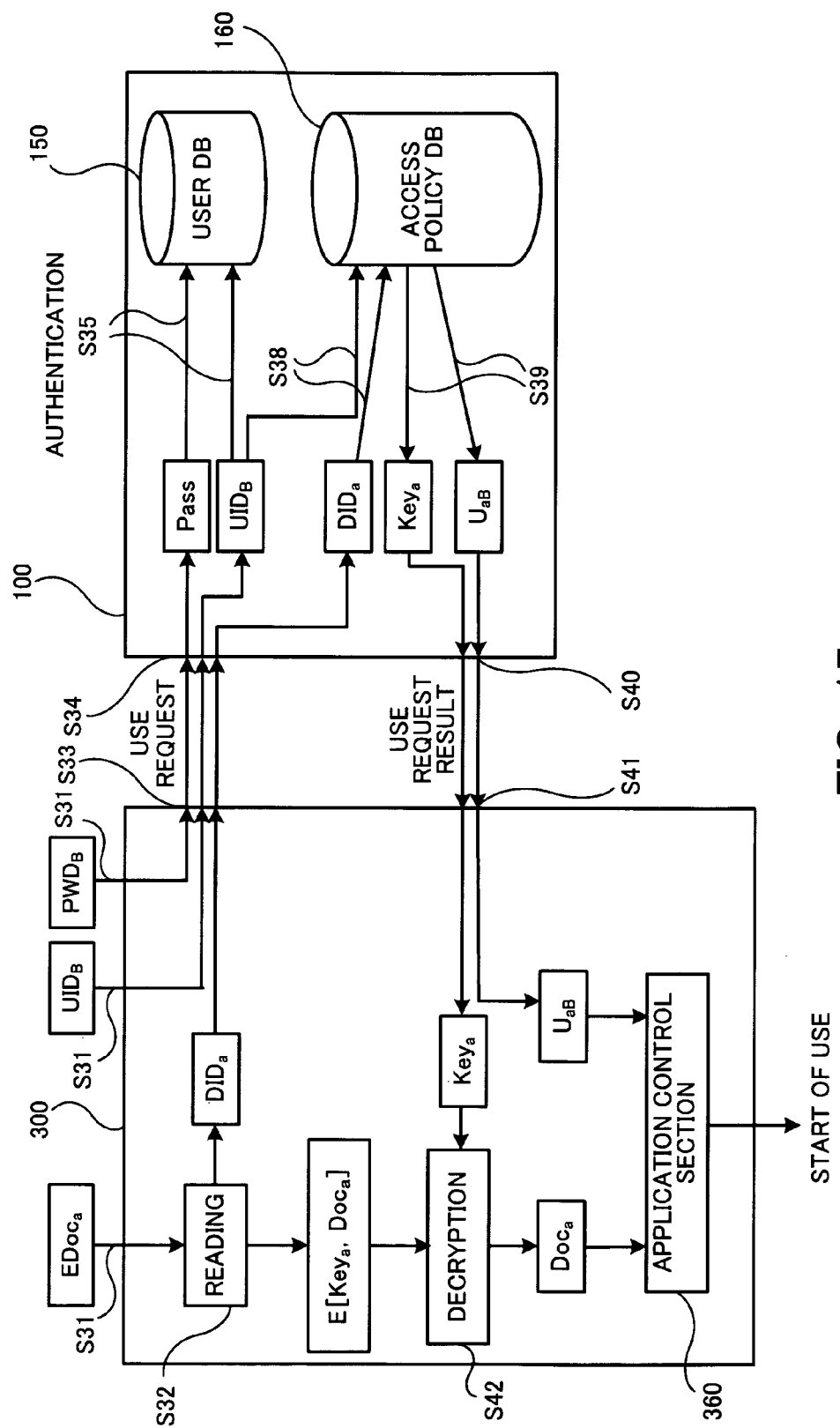
FIG. 17 is a diagram of the outline of the use process.

FIG. 17 is a diagram of the outline of the use process.

Incidentally, in the case where the primary distributee specifies one distributee (specific distributee) out of secondary distributees and permits the specific distributee to use an electronic document, the primary distributee enters the primary distributee's own user ID and password in the respective entry fields 51 and 52 on the access policy-setting screen 50 using the client 300. Then, the primary distributee enters a protected electronic document desired to be accessed in the entry field 55 of the access policy entry section 50a, and the user ID or group ID of the specific distributee desired to be added in the entry field 56, and selects options in the respective selection fields as required. Then, when the primary distributee presses the "add" button 53b, a process (specific distributee-specifying process) for adding the access policy for the specific distributee in the access policy management table 162 and the link access policy management table 163 stored in the access policy DB 160 of the access rights management server 100 is started. More specifically, the access policy-setting section 340 sends finally determined information to the client control section 310, and the client control section 310 gives instructions to the respective relevant sections for executing the process.

Next, the specific distributee-specifying process will be described by taking an example of the case where the user B using the client 300 specifies the user C as the specific distributee so as to permit the user C to use the protected electronic document "$EDoc_a$".

Figure 18:
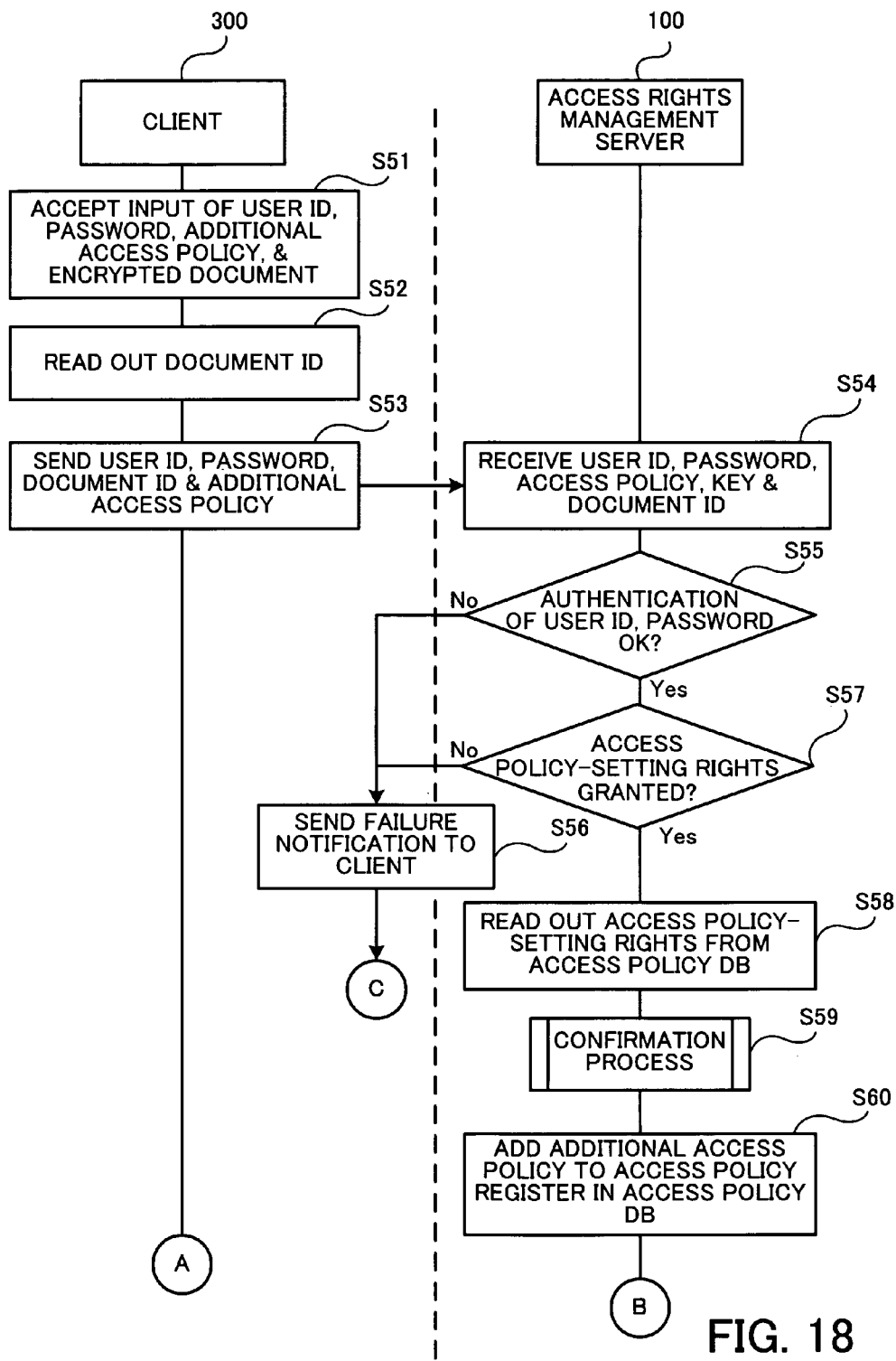
FIG. 18 is a flowchart of a specific distributee-specifying process.
Figure 19:
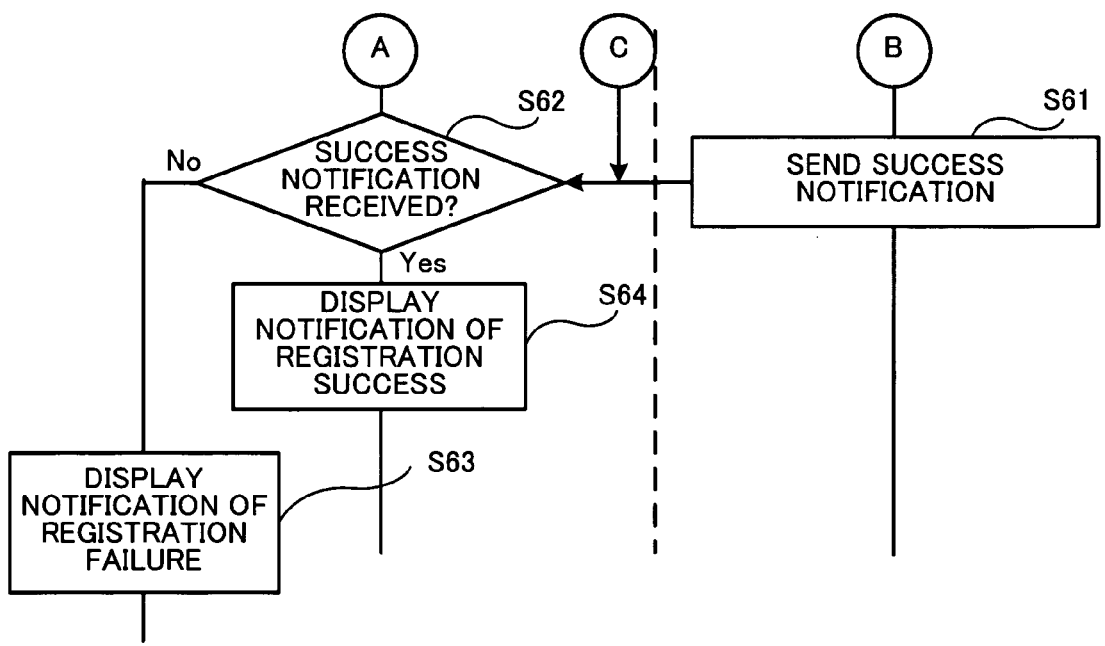
FIG. 19 is a continuation of the flowchart shown in FIG. 18.

FIGS. 18 and 19 are a flowchart of the specific distributee-specifying process.

First, the client control section 310 accepts an operating input giving an instruction for adding an access policy set for the user C in association with the protected electronic document. More specifically, when the "add" button 53b is pressed by the user B, the client control section 310 accepts input of the user B's user ID "$UID_B$" and password "$PWD_B$", an access policy (hereinafter referred to "the additional access policy) "$AP_C$", and the protected electronic document "$EDoc_a$" entered by the use B, in the access policy-setting screen 50 (step S51). The additional access policy "$AP_C$" stores the user C's user ID.

Next, the document ID-reading section 351 reads out the document ID "$DID_B$" and the password "$PWD_B$" (step S52).

Then, the communication section 370 sends the user ID "$UID_B$", the password "$PWD_B$", the additional access policy "$AP_C$", and the document ID "$DID_a$" to the access rights management server 100, as a specific distributee-specifying request (step S53).

When the communication section 120 of the access rights management server 100 receives these information items (step S54), the server control section 110 transfers the user ID "$UID_B$" and the password "$PWD_B$" to the user authentication section 140.

Then, the user authentication section 140 checks the user ID "$UID_B$" and the password "$PWD_B$" for authentication (step S55). If the user ID "$UID_B$" and the password "$PWD_B$" are not authenticated (NO to the step S55), the communication section 120 sends a failure notification (i.e. a result of the specific distributee-specifying request) to the client 300 (step S56).

On the other hand, if the user ID "$UID_B$" and the password "$PWD_B$" are authenticated (YES to the step S55), the access policy-setting rights-confirming section 132 refers to the access policy management table 162 to thereby confirm whether or not the user having the user ID "$UID_B$" is granted access policy-setting rights to the electronic document having the document ID "$DID_a$" (step S57). If the user is not granted the access policy-setting rights (NO to the step S57), the communication section 120 sends a failure notification to the client 200 (step S56).

On the other hand, if the user is granted the access policy-setting rights (YES to the step S57), the access policy-reading section 134 reads out the access policy-setting rights "$A_{aB}$" associated with the user ID "$UID_B$" from the access policy DB 160 (step S58).

Next, the access policy-setting rights-confirming section 132 carries out a confirmation process for confirming whether or not the additional access policy "$AP_C$" is within the scope of the access policy-setting rights "$A_{aB}$" associated with the user ID "$UID_B$" (step S59).

When the confirmation process is successful, the access policy registration section 133 registers the additional access policy "$AP_C$" in the access policy management table 162 in which the access policy "$AP_a$" associated with the document ID "$DID_a$" is set (step S60).

Then, the communication section 120 sends a success notification (i.e. a result of the specific distributee-specifying request) to the client 300 to indicate that the registration is successful (step S61).

The communication section 370 determines whether or not the success notification has been received (step S62).

If the communication section 370 has received the failure notification (NO to the step S62), the client control section 310 displays a notification screen indicative of registration failure on the monitor, for example (step S63).

If the communication section 370 has received the success notification (YES to the step S62), the client control section 310 displays a notification screen indicative of registration success on the monitor, for example (step S64).

Thus, the specific distributee-specifying process is terminated.

Figure 20:
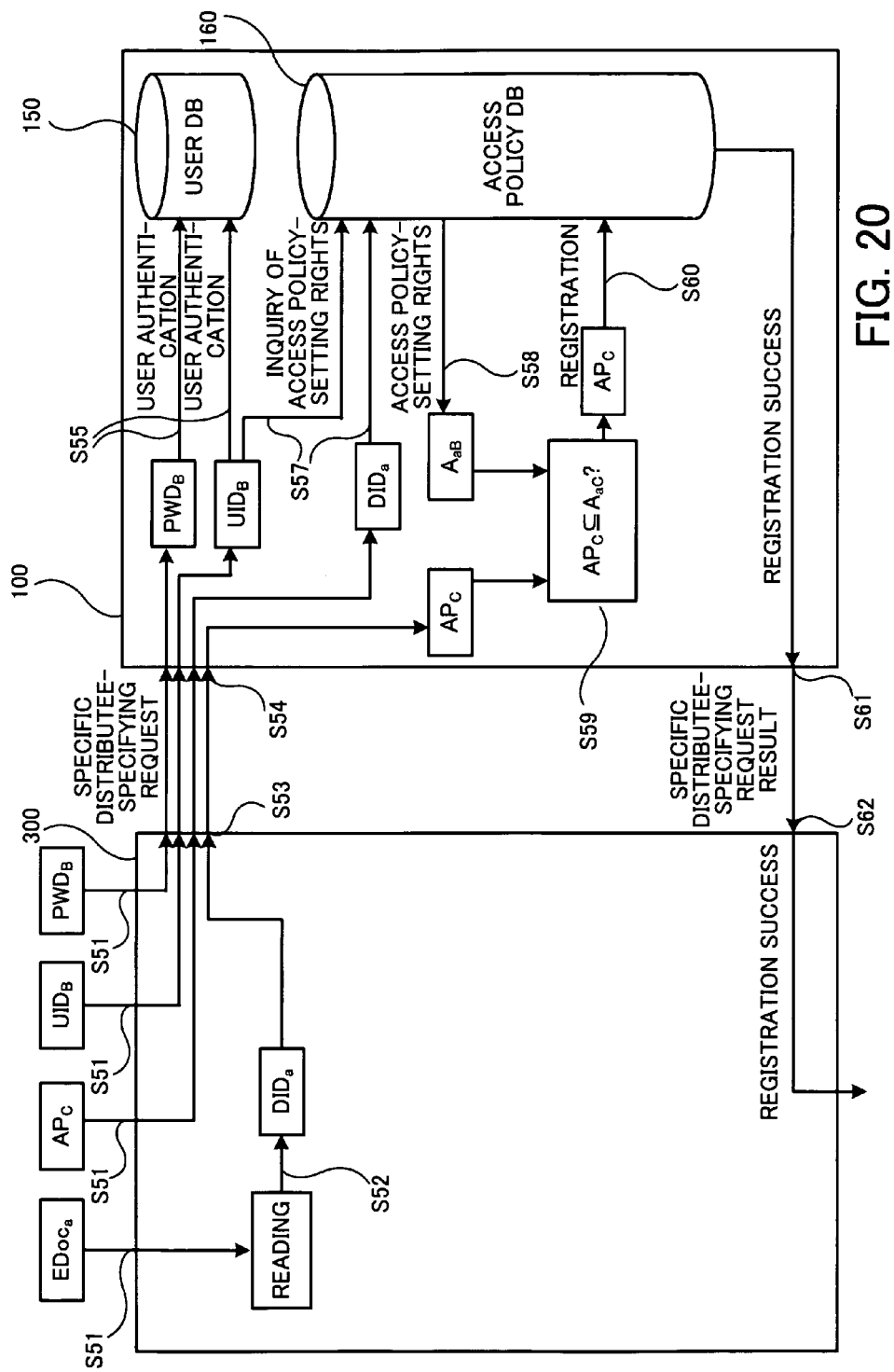
FIG. 20 is a diagram of the outline of the specific distributee-specifying process.

FIG. 20 is a diagram of the outline of the specific distributee-specifying process.

Next, a description will be given of the confirmation process executed in the step S59.

Figure 21:
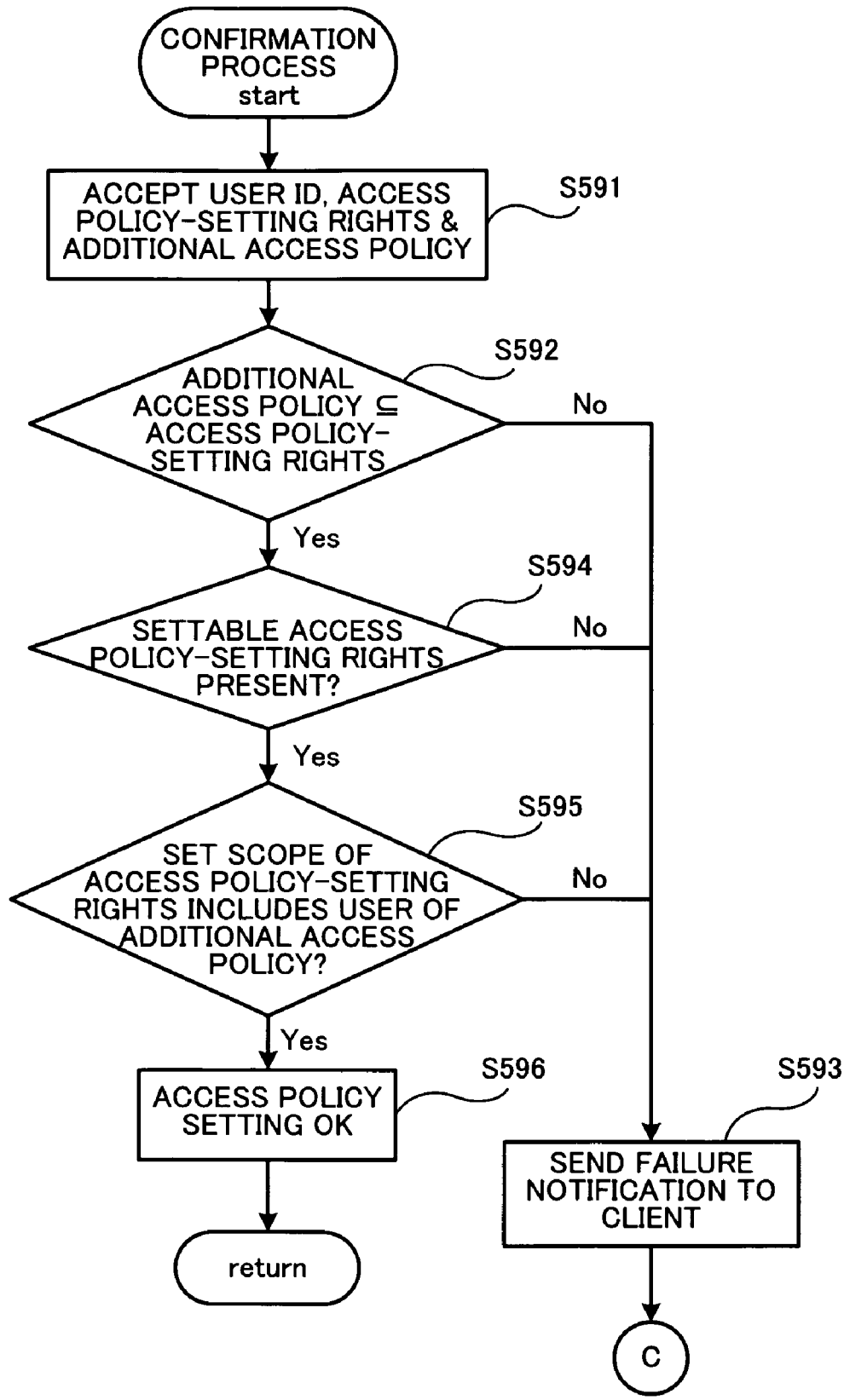
FIG. 21 is a flowchart of a confirmation process.

FIG. 21 is a flowchart of the confirmation process.

First, input of the access policy-setting rights "$A_{aB}$" associated with the user ID "$UID_B$" and the additional access policy "$AP_C$" is accepted (step S591).

Then, it is determined whether or not the scope of use rights that can be set by the access policy-setting rights "$A_{aB}$" covers (includes) the scope of use rights of the additional access policy "$AP_C$" (step S592). This determination can be performed by referring to the "settable use rights" column in the link access policy management table 163.

If the scope of the use rights of the additional access policy "$AP_C$" is not included in the scope of the use rights that can be set by the access policy-setting rights "$A_{aB}$" (NO to the step S592), the communication section 120 sends a failure notification to the client 200 (step S593).

If the scope of the use rights of the additional access policy "$AP_C$" is included in the use rights that can be set by the access policy-setting rights "$A_{aB}$" (YES to the step S592), it is determined whether or not access policy-setting rights that can be set by (using) the access policy-setting rights "$A_{aB}$" is present (step S594). This determination can be performed by referring to the "access policy setting" column in the access policy management table 162.

If no access policy-setting rights that can be set using the access policy-setting rights "$A_{aB}$" is present (NO to the step S594), the communication section 120 sends the failure notification to the client 200 (step S593).

If access policy-setting rights that can be set using the access policy-setting rights "$A_{aB}$" is present (YES to the step S594), it is determined by referring to the group management table 161 whether or not user IDs or group IDs set in the "defined-range user ID or group ID" column associated with the access policy-setting rights "$A_{aB}$" include the user ID "$UID_C$" associated with the access policy "$AP_C$" (step S595).

If the user ID "$UID_C$" associated with the access policy "$AP_C$" is not included in the user IDs or group IDs set in the "defined-range user ID or group ID" column associated with the access policy-setting rights "$A_{aB}$" (NO to the step S595), the communication section 120 sends the failure notification to the client 200 (step S593).

If the user ID "$UID_C$" associated with the access policy "$AP_C$" is included in the user IDs or group IDs (YES to the step S595), it is determined that access policy setting is approved (OK) (step S596), followed by terminating the confirmation process.

Although in the present embodiment, a description has been given of the case where a specific distributee is specified in an access policy, it is also possible to change the specific distributee in the access policy by substantially the same process as the specific distributee-specifying process. More specifically, a person who intends to change a specific distributee changes items entered in entry fields or options selected in selection fields in the access policy-setting screen 50, and presses the "add" button 53b. Then, when the confirmation process is successful, the access policy registration section 133 of the access rights management server 100 determines whether or not an access policy having the changer's user ID is present in the access policy management table 162. If an access policy having the changer's user ID is present, the access policy is reconfigured, and then the reconfigured access policy is registered in the access policy management table 162.

Next, the above-mentioned processes will be described using examples.

First Example

In the first example, a description will be given of the case where a department chief who is authorized to set a reading right, a printing right, and access policy-setting rights, as desired, and is assigned a user ID "suzuki" distributee an electronic document to a first sales section assigned a group ID "eigyo1".

The department chief distributee a protected electronic document to a first-sales section chief (hereinafter simply referred to as the section chief) who supervises the first sales section and is assigned the user ID "yamada".

The department chief sets a document ID "DOC0001", a user ID or group ID "yamada", a reading right "yes", a printing right "yes", and access policy-setting rights "yes" in the access policy entry section 50a. Further, the department chief selects the tab 64 of a link 1 of the link access policy entry section 50b, and sets a defined-range user ID or group ID "eigyo1", a reading right "yes", a printing right "no", and settable access policy-setting rights "no" therein. At this time point, the department chief does not know who will be in charge of the job.

FIGS. 22A and 22B are diagrams of an access policy management table and a link access policy management table for illustrating the example of the present embodiment.

When the department chief presses the "new registration" button 53a, the access policy management table 162a concerning the section chief as shown in FIG. 22A and the link access policy management table 163a concerning the first sales section as shown in FIG. 22B are set in the access policy DB 160. Thereafter, the department chief sends a protected electronic document to the section chief as a file attached to an electronic mail e.g. with a message saying "I would like you to charge someone of your section with this job".

Since the reading right and the printing right are both set to "yes" in the access policy management table 162a, the section chief can read and print the electronic document by carrying out the above-described use process.

Further, the section chief exercises the access policy-setting rights granted by the department chief to thereby designate his subordinate A who is assigned a user ID "sato" as a person in charge of the job, and if he permits the subordinate A only reading of the electronic document, the section chief adds an access policy associated with the subordinate A as a primary distributee as viewed from the section chief (i.e. a secondary distributee as viewed from the department chief) via the access policy-setting screen 50.

Figure 23:
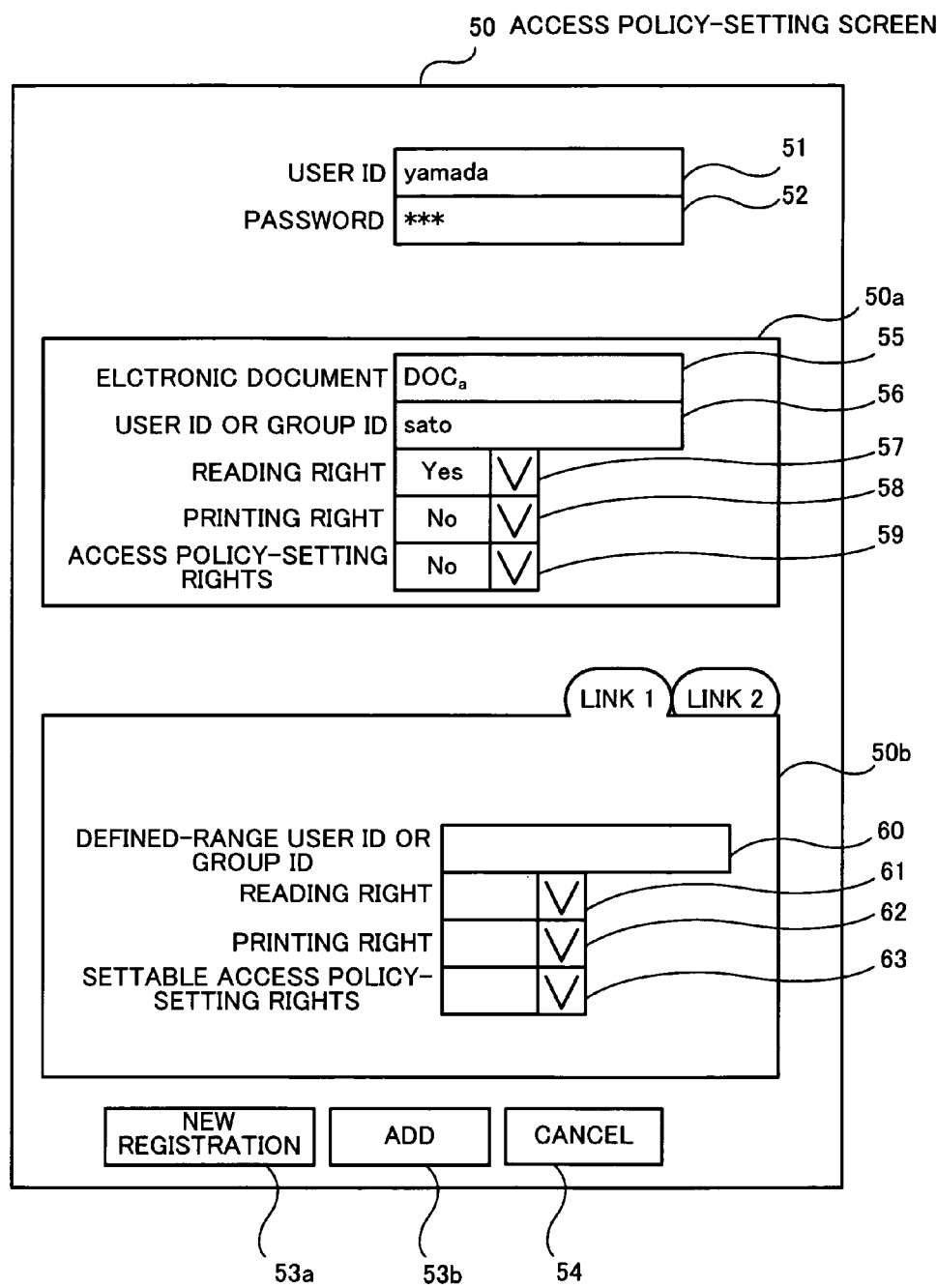
FIG. 23 is a view of an access policy-setting screen of the example.

FIG. 23 is a view of the access policy-setting screen of the example.

Although the section chief is granted the access policy-setting rights, what can be practically reconfigured using the access policy-setting rights is limited by the link access policy management table 163a set by the department chief, to a user ID or a group ID and approval or denial of the reading right. More specifically, the section chief is not permitted to select the printing right (i.e. use rights other than the granted use rights) as the use rights, or to change the "access policy-setting rights" to "yes" to thereby grant the access policy-setting rights to the subordinate A, or to select a person from the second sales section. When the section chief performs such an unauthorized reconfiguration and then presses the add button 53b, the access rights management server 100 executes the specific distributee-specifying process to reject the reconfiguration. On the other hand, nulling all use rights granted to the subordinate A, or other reconfiguration for limiting the use rights and the access policy-setting rights is permitted insofar as the reconfiguration is within the scope of the access policy-setting rights of the section chief.

When the section chief sets the user ID to "sato" and the reading right to "yes", and presses the add button 53b, the specific distributee-specifying process is executed, and then the access policy management table 162a is changed.

Figure 24:
FIG. 24 is a view of an access policy management table determined after designation of a person in charge.

FIG. 24 is a view of the access policy management table after designation of the person in charge.

This permits the subordinate A to read the electronic document by executing the use process.

As described above, the department chief as the author of the electronic document can grant the access policy-setting rights to the section chief, so that the department chief need not directly select a person to be charged with the job from personnel of the first sales section. This makes it possible to reduce burden on the department chief.

Further, by setting the settable access policy-setting rights in the link access policy management table 163 when setting the first access policy, the department chief can permit the personnel of the first sales section to use the electronic document only within the scope of the granted use rights. Thus, approval or denial of distribution of the electronic document to the first sales section can be strictly set, which makes it possible to easily and reliably suppress or prevent leakage of the electronic document.

Further, the section chief can specify the subordinate A so as to cause him to take charge of the job in the first sales section, without consulting the department chief, and carry out the specific distributee-specifying process to thereby permit only the subordinate A in the first sales section to use the electronic document.

When a conventional access policy management, such as user-based access policy management or role-based access policy management, is employed, as the size of an organization using policies increases and the organization is made more hierarchical, operations required to be carried out by an author become so complicated as to cause the incapability of use and management of policies. In contrast, according to the present embodiment, even a large-scale and hierarchical organization can safely manage the use of electronic documents with ease and high efficiency.

Moreover, even when each user belongs to one or more groups, the relationships between the groups and those between users and the groups can be easily grasped, which facilitates the management of use of electronic documents.

Second Example

In the second example, a description will be given of the case where a department chief authorized to set a reading right, a printing right, and access policy-setting rights, as desired, newly adds a user who belongs to a section other than the first sales section and is assigned a user ID "tanaka", as a user for whom a section chief can set an access policy using the access policy of the section chief.

Figure 25:
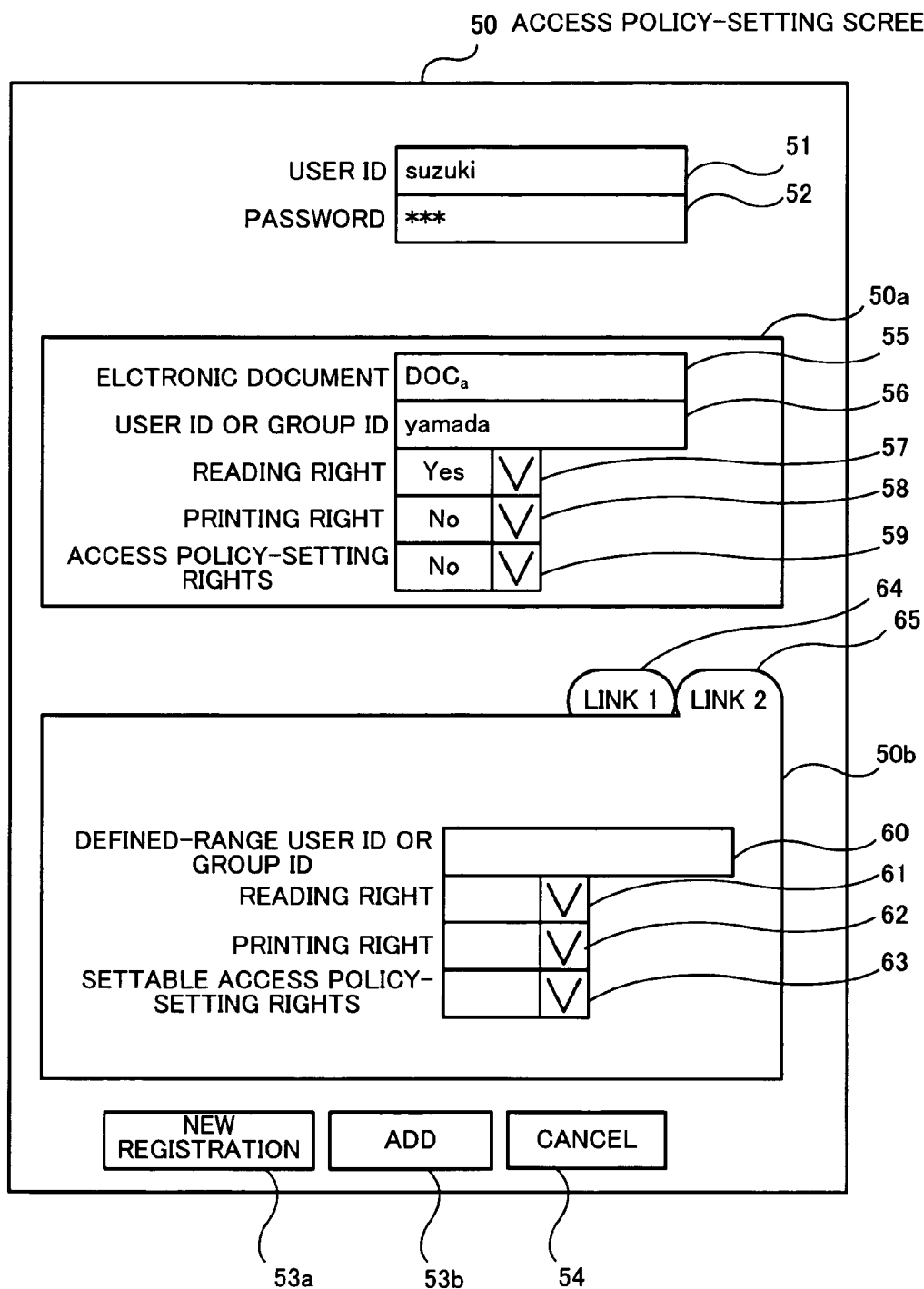
FIG. 25 is a view of an access policy-setting screen of a second example.

FIG. 25 is a view of the access policy-setting screen of the second example.

The department chief sets a document ID "DOC0001", a user ID or group ID "yamada", a reading right "yes", a printing right "yes", and access policy-setting rights "yes" in the access policy entry section 50a. Further, the department chief selects the tab 65 of a link 2 of the link access policy entry section 50b, and sets a defined-range user ID or group ID "tanaka", a reading right "yes", a printing right "no", and settable access policy-setting rights "no". Then, the department chief presses the "add" button 53b.

FIG. 26B is a diagram of the link access policy management table with a user added thereto.

As shown in FIGS. 26A and 26B, when the user is added, the link access policy management table 163a is updated to a link access policy management table 163b. In the link access policy management table 163b, the column of the "next link ID" field is changed. More specifically, "LINK00002" is set in the "next link ID" column. Then, a new link access policy reflecting changes on the access policy-setting screen is generated. More specifically, "LINK00002" is set in a field of the "link ID" column. The user ID "tanaka" is set in a field of the "user ID or group ID" column. In a field of the "reading right" column is set "yes", and in a field of the "printing right" column is set "no". In a field of the "settable access policy-setting rights" column is set "no", and in a field of the "next link ID" column is set "null". This enables the section chief to apply the specific distributee-specifying process to the user having the user ID "tanaka", and the user having the user ID "tanaka" is permitted to execute the use process to thereby read the electronic document. As described above, according to the second example, addition and deletion of specific distributees can be easily performed.

Next, a description will be given of a system according to a second embodiment of the present invention.

In the following, a description will be given of only different points of the system according to the second embodiment from that in the first embodiment, and description of the same points is omitted.

The system according to the second embodiment is distinguished from the system according to the first embodiment in that a default access policy can be set when setting access policy-setting rights to a user.

In the case where the primary distributee using the client 200 executes the default setting of the access policy-setting rights, the primary distributee operates the keyboard or the like to send a default access policy-setting request to the client control section 210. When receiving the default access policy-setting request, the client control section 210 transfers the default access policy-setting request to the access policy-setting section 240. The access policy-setting section 240 starts a default access policy addition screen on the monitor connected to the client 200.

Figure 27:
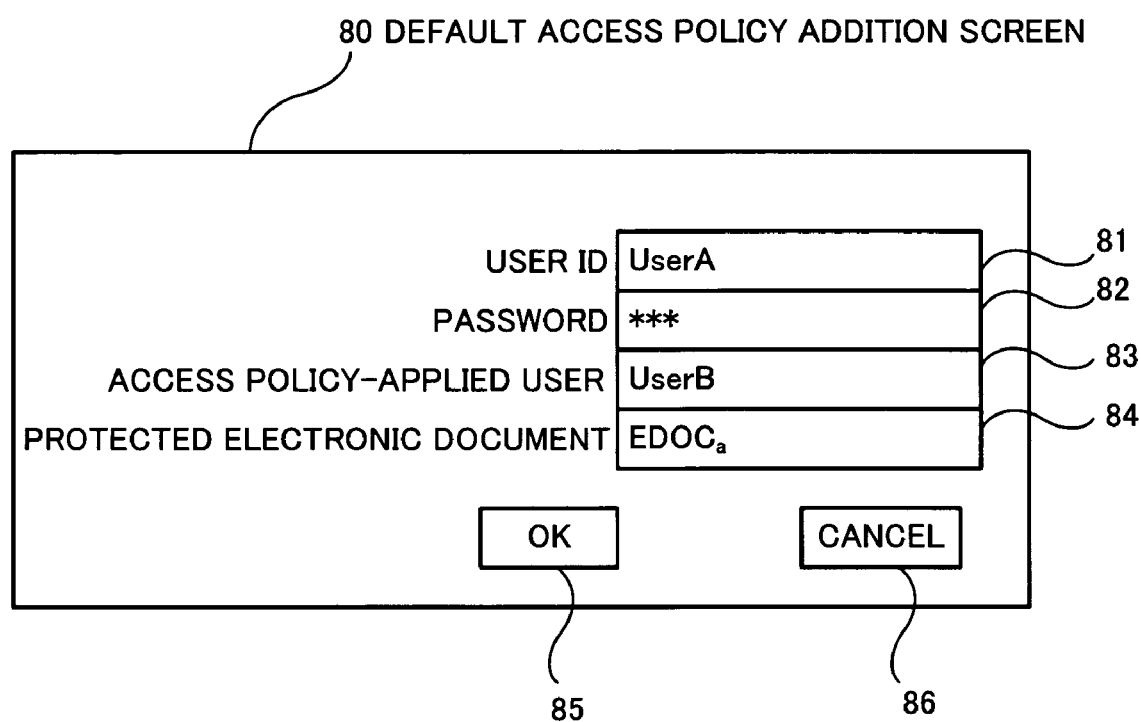
FIG. 27 is a view of a default access policy addition screen.

FIG. 27 is a view of the default access policy addition screen.

The default access policy addition screen 80 is comprised of an entry field 81 for entering the user ID of a default access policy-creating user, an entry field 82 for entering the password of the user, an entry field 83 for entering the user ID of an access policy-applied user, an entry field 84 for entering a protected electronic document, an "OK" button 85, and a "cancel" button 86.

When the user A as a primary distributee enters the user's own user ID and password, the user ID of the user B to whom an access policy is applied, and the name of a protected electronic document, and presses the "OK" button 85, a default access policy-setting process is started. More specifically, the access policy-setting section 240 sends finally determined information to the client control section 210, and the client control section 210 gives instructions to the respective relevant sections for execution of the default access policy-setting process.

Next, the default access policy-setting process will be described by taking an example of the case where the user A sets the access policy-setting rights for the user B under the following rules:

defined-range user ID or group ID: a range satisfying an AND condition of a set scope of the user A's access policy and a group to which the user B belongs settable use rights: user A's use rights settable access policy-setting rights: null It should be noted that these rules are stored in advance in the access rights management server 100.

Figure 28:
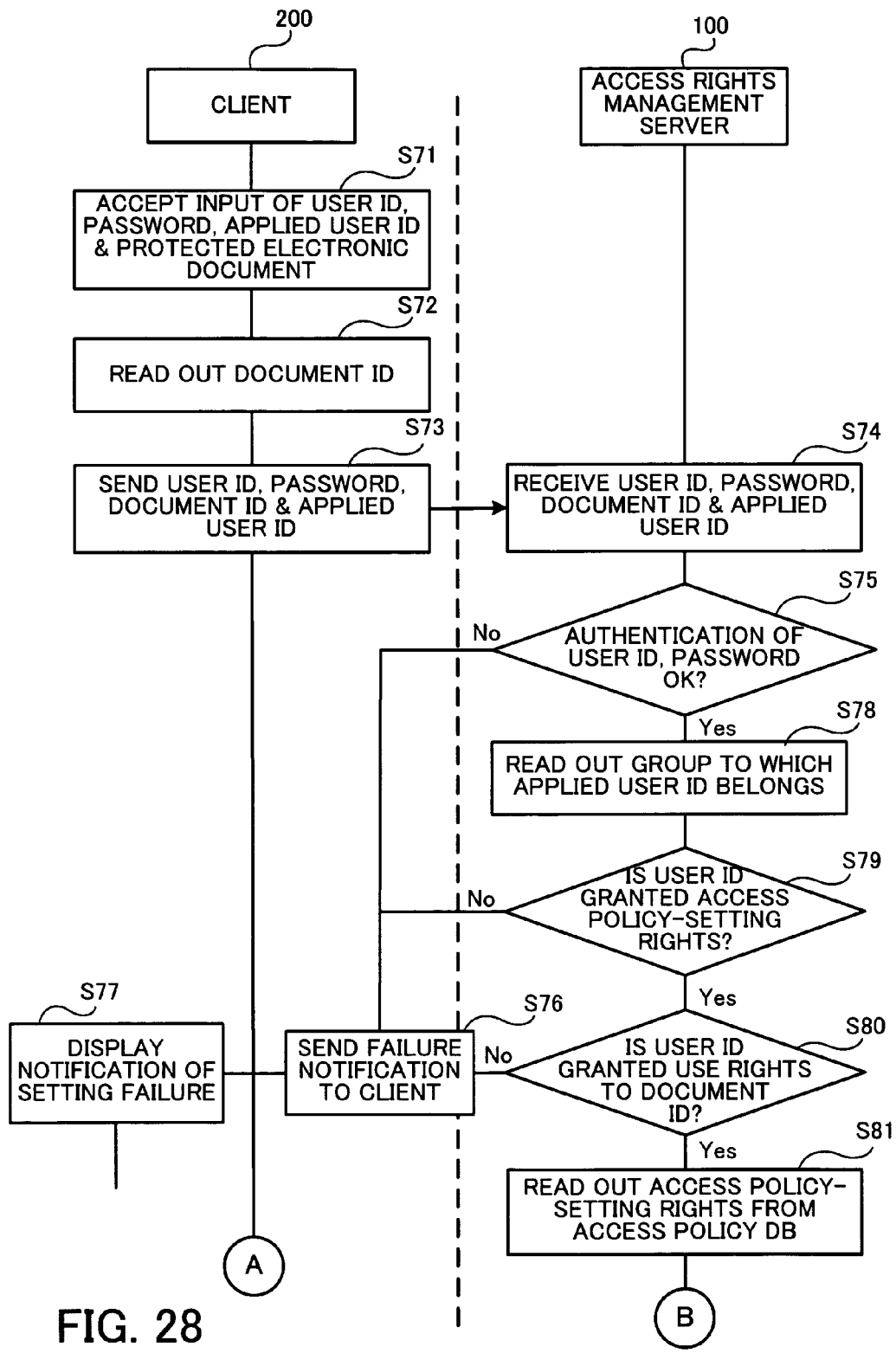
FIG. 28 is a flowchart of a default access policy-setting process.
Figure 29:
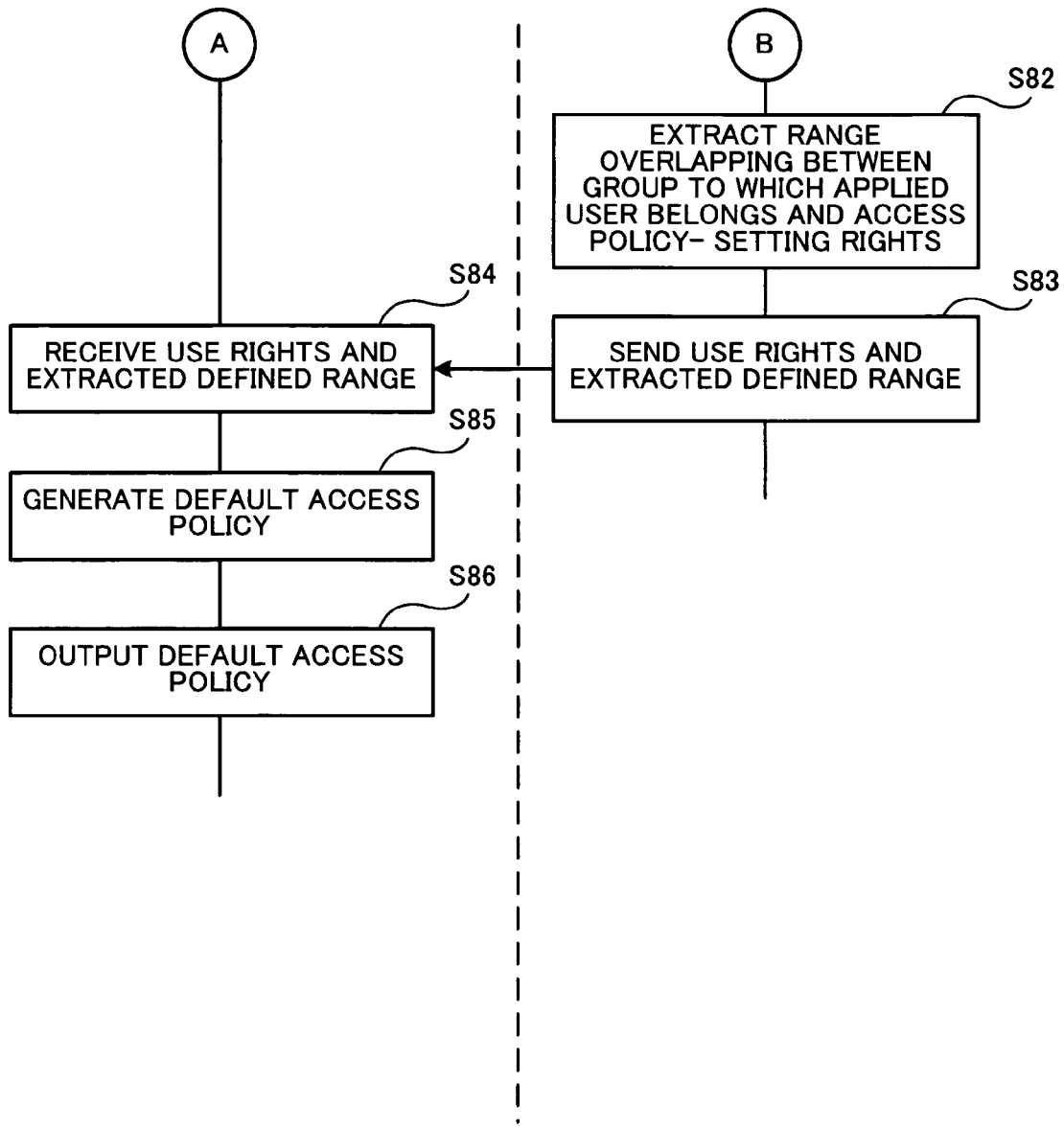
FIG. 29 is a continuation of the flowchart shown in FIG. 28.

FIGS. 28 and 29 are a flowchart of the default access policy-setting process.

First, the client control section 210 accepts a user A's operating input giving an instruction for creating an electronic document. More specifically, when the "OK" button 85 is pressed by the user A, the client control section 210 accepts input of the user A's user ID "$UID_A$" and password "$PWD_A$", the user ID "$UID_B$" of the additional access policy-applied user (applied user ID), and the protected electronic document "$EDoc_a$", which have been entered in the default access policy addition screen 80 (step S71).

Next, the document ID-reading section 251 reads out the document ID "$DID_a$" (step S72).

Then, the communication section 270 sends the user ID "$UID_A$", the password "$PWD_A$", the document ID "$DID_a$", and the user ID "$UID_B$" to the access rights management server 100 (step S73).

When the communication section 120 of the access rights management server 100 receives these information items (step S74), the server control section 110 transfers the user ID "$UID_A$" and the password "$PWD_A$" to the user authentication section 140.

Then, the user authentication section 140 checks the user ID "$UID_A$" and the password "$PWD_A$" for authentication (step S75). If the user ID "$UID_A$" and the password "$PWD_A$" are not authenticated (NO to the step S75), the communication section 120 sends a failure notification to the client 200 (step S76). Then, the client control section 210 displays a notification screen indicative of setting failure on the monitor, for example (step S77), followed by terminating the default access policy-setting process.

On the other hand, if the user ID "$UID_A$" and the password "$PWD_A$" are authenticated (YES to the step S75), a group ID "$Rol_B$" of the group to which the user B having the user ID "$UID_B$" belongs is read from the group management table 161 (step S78).

Next, the access policy-setting rights-confirming section 132 determines whether or not the user having the user ID "$UID_A$" is granted the access policy-setting rights associated with the document ID (step S79).

If the user is not granted the access policy-setting rights (NO to the step S79), the steps S76 et seq. are executed.

If the user is granted the access policy-setting rights (YES to the step S79), the use rights-confirming section 131 determines whether or not the user having the user ID "$UID_A$" is granted use rights to the electronic document having the document ID "$DID_a$" (step S80).

If the user is not granted the use rights (NO to the step S80), the steps S76 et seq. are executed.

If the user is granted the use rights (YES to the step S80), the access policy-reading section 134 reads out access policy-setting rights "$A_{aA}$" associated with the user ID "$UID_A$" and use rights "$U_{aA}$" from the access policy management table 162 (step S81).

Next, the access policy-setting rights-confirming section 132 extracts a range overlapping (AND) between the group ID "$Rol_B$" to which the user ID "$UID_B$" belongs and a set scope of the access policy-setting rights "$A_{aA}$" associated with the user ID "$UID_A$" (step S82).

Then, the communication section 120 sends the use rights "$U_{aA}$" and the extracted overlapping range to the client 200 (step S83).

When the communication section 270 receives the use rights "$U_{aA}$" and the extracted overlapping range (step S84), the access policy-setting section 240 generates a default access policy "$A_{aB}$" using the use rights "$U_{aA}$" and the extracted overlapping range (step S85).

Then, the access policy-setting section 240 displays the generated default access policy on the monitor or the like (step S86).

This completes the default access policy-setting process.

It should be noted that it is preferable to store the default access policy output from the access policy-setting section 240 in an HDD 203 or the like of the client 200 thereby allowing the default access policy to be read e.g. on the access policy-setting screen 50. This makes it possible to perform smooth access policy setting.

The system according to the second embodiment can provide the same advantageous effects as provided by the system according to the first embodiment.

Further, according to the system of the second embodiment, even when there are a large number of distributees, access policy setting can be easily performed. Furthermore, since the access policy-setting rights-confirming section 132 extracts the range overlapping (AND) between the group "$Rol_B$" to which the user "$UID_B$" belongs and a scope of the access policy-setting rights "$A_{aA}$" associated with the user ID "$UID_A$", it is possible to prevent the distributees from being given excessive rights, and therefore the use of the electronic document can be safely managed with ease.

Although the access rights management program, the access rights management apparatus, and the access rights management method according to the present invention are described based on the illustrated embodiments, the present invention is by no means limited to any specific one of the above-described embodiments, but each section can be replaced by an arbitrary section provided with the same functions. Further, other optional structures and process steps may be added to the present invention.

Further, the present invention may be constituted by a combination of more than two configurations (features) optionally selected from the above-described embodiments.

In addition, it is preferable to cause a computer executing the access rights management program of the present invention to execute a document access management program which is capable of accurately judging an access log-based access status based on an access policy even after access policy reconfiguration.

Figure 30:
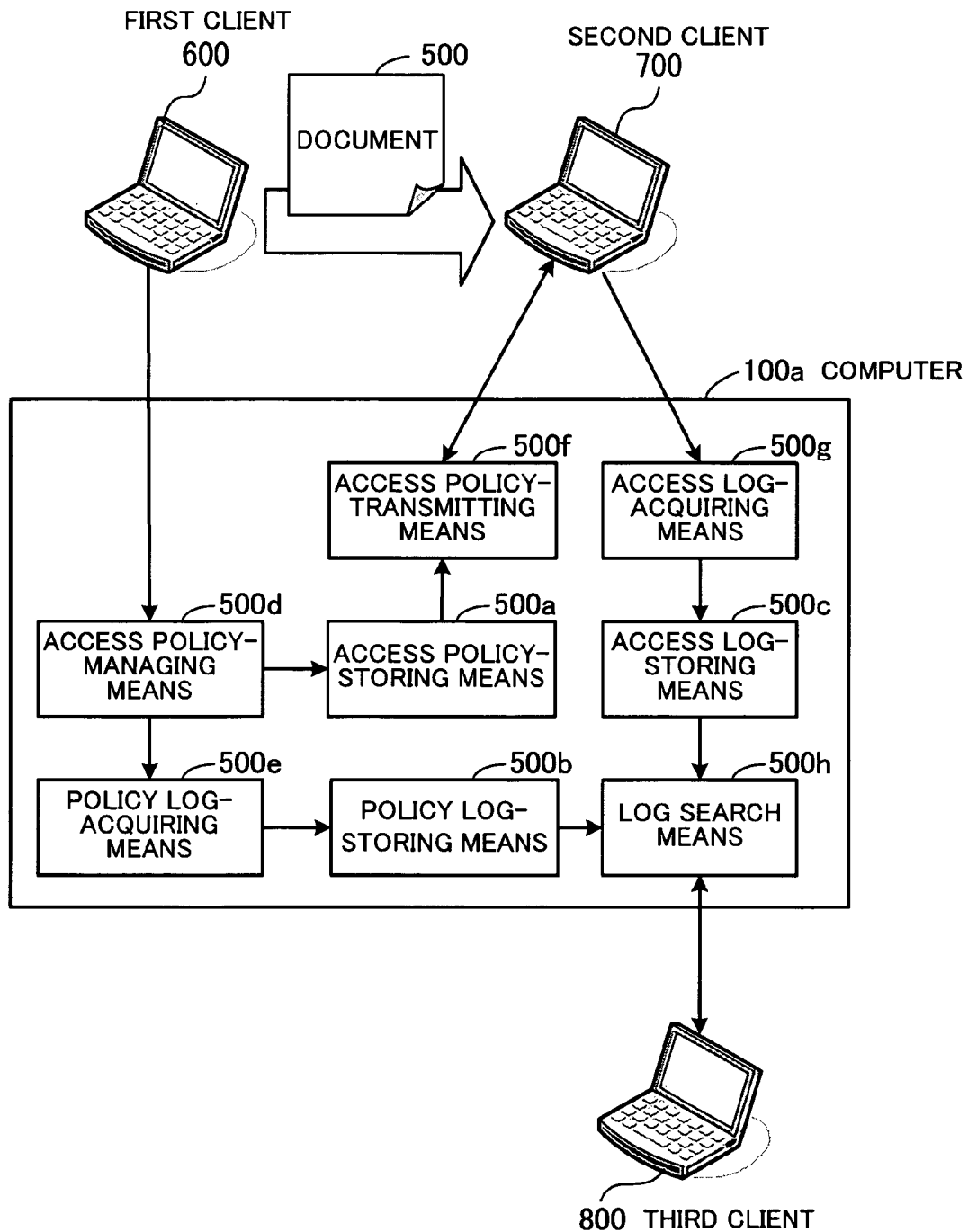
FIG. 30 is a diagram of the outline of a document access management program.

FIG. 30 is a diagram of the outline of the document access management program.

This document access management program can be executed by operating a computer 100a having functions shown in FIG. 30.

Connected to the computer 100a are a first client 600, a second client 700, and a third client 800. A document (electronic document) 500 is distributed from the first client 600 to the second client 700. The second client 700 is provided not only with an access function e.g. for reading the document 500 but also with a function of acquiring an access log associated with the document 500. The access log acquired by the second client 700 is sent to the computer 100a in predetermined timing (e.g. immediately after the second client 700 accesses the document 500 or when communication between the second client 700 and the computer 100a is enabled).

The computer 100a is provided with an access policy-storing means 500a, a policy log-storing means 500b, an access log-storing means 500c, an access policy-managing means 500d, a policy log-acquiring means 500e, an access policy-transmitting means 500f, an access log-acquiring means 500g, and a log searching means 500h, so as to manage the status of access to the document 500.

The access policy-storing means 500a stores access policies defining conditions for permitting access to the document 500. For example, the access policy defines users to be permitted to read the document 500, clients to be permitted to read the document 500, and so forth.

The policy log-storing means 500b stores policy logs indicative of details of operations for setting the access policies. The policy logs contain the contents of each access policy before and after reconfiguration thereof, for example.

The access log-storing means 500c stores an access log indicative of details of access to the document 500. The access log contains the date and time of each access and the name of an accessed document as well as information indicative of whether or not the access is an unauthorized one, for example.

The access policy-managing means 500d accepts an access policy-setting request from the first client 600, and sets a new access policy to be stored in the access policy-storing means 500a or reconfigures an access policy stored in the access policy-storing means 500a, in response to the access policy-setting request. It should be noted that when an illegality, such as tampering of an access log, is detected, the access policy-managing means 500d is capable of automatically reconfiguring an access policy associated with a sender of the access log to thereby inhibit access to the document 500 from a client used by the sender of the access log.

When the access policy is newly set or reconfigured by the access policy-managing means 500d, the policy log-acquiring means 500e stores the newly set access policy or the reconfigured access policy in the policy log-storing means 500b. Policy logs acquired by the policy log-acquiring means 500e include one indicative of details of operations for setting an access policy in response to an access policy-setting request and one indicative of details of operations automatically carried out by the access policy-managing means 500d for reconfiguring an access policy e.g. when an illegality is detected.

When an access policy-acquiring request associated with the document 500 is input from the second client 700, the access policy-transmitting means 500f acquires the access policy associated with the document 500 from the access policy-storing means 500a, and sends the acquired access policy to the second client 700. As a consequence, the second client 700 executes access to only the document 500, which is authorized in the access policy. At this time, an access log indicative of the access status is generated in the second client 700. It should be noted that when an operating input is performed on the second client 700 to request an access which is not authorized in the access policy, an access log indicating an unauthorized access is generated.

The access log-acquiring means 500g acquires the access log associated with the document 500 from the second client 700, and stores the acquired access log in the access log-storing means 500c. It should be noted that when acquiring the access log, the access log-acquiring means 500g confirms whether illegal processing, such as tampering, is not performed on the access log. For example, the second client 700 adds a signature to the access log before sending the same, and the access log-acquiring means 500g checks the authenticity of the signature to thereby judge whether or not the access log has been illegally processed.

Upon reception of search conditions from the third client 800, the log searching means 500h acquires a policy log matching the search conditions from the policy log-storing means 500b and an access log matching the search conditions from the access log-storing means 500c, and sends the acquired policy log and access log to the third client 800.

According to the computer 100a configured as above, when an access policy-setting request is input from the first client 600, the access policy-managing means 500d sets a new access policy to be stored in the access policy-storing means 500a or reconfigures an access policy stored in the access policy-storing means 500a, in response to the access policy-setting request. Then, the policy log-acquiring means 500e stores the newly set access policy or the reconfigured access policy in the policy log-storing means 500b. Further, when an access policy-acquiring request associated with the document 500 is input from the second client 700, the access policy-transmitting means 500f acquires the access policy associated with the document 500 from the access policy-storing means 500a, and sends the acquired access policy to the second client 700. Thereafter, the access log-acquiring means 500g acquires an access log associated with the document 500 from the second client 700, and the acquired access log is stored in the access log-storing means 500c. Then, when a log acquiring request containing a search key is input from the third client 800, the log searching means 500h acquires a policy log matching the search conditions from the policy log-storing means 500b and an access log matching the search conditions from the access log-storing means 500c, and then the acquired policy log and access log are sent to the third client 800.

As described above, whenever an access policy is set or reconfigured, details of the operation are stored as a policy log, and when a log acquiring request is issued, a access log and a policy log are retrieved from the stored logs in response to the log acquiring request and sent to the requesting side. This makes it possible to clearly determine what could not be clearly grasped from an access log alone.

For example, there is a case where when an access policy associated with the document 500 is changed or reconfigured, a user authorized so far to read the document 500 is inhibited from reading the document 500. In such a case, all that can be grasped by referring to the associated access log alone is the fact that reading of the document 500 by the user who had read the document 500 before has been determined to be illegal since a certain time point. However, by referring to the associated policy as well, it can be determined that reading of the document 500 is inhibited due to a change or reconfiguration of the access policy.

It should be noted that the document access management program is described in detail in Japanese Patent Application No. 2006-137961.

This enables an author to easily keep track of an electronic document distributed by the author himself/herself and hence easily and reliably grasp details of distributions of the electronic document to a primary distributee et seq. as distribution destinations, which makes it possible to facilitate reconfiguration or the like of access policies e.g. based on the details of the distributions of the electronic document.

It should be noted that the processing functions described above can be realized by a computer (by causing the computer to execute a predetermined right management program). To this end, there is provided a program describing the details of processing of the functions which the access rights management server 100 should have. By executing the program on the computer, the above-described processing functions are realized on the computer. The program describing details of the processes can be recorded in a computer-readable recording medium. Examples of the computer-readable recording medium include a magnetic recording device, an optical disk, a magneto-optical recording medium, and a semiconductor memory. The magnetic recording device includes a hard disk drive, a flexible disk (FD), and a magnetic tape. The optical disk includes e.g. a DVD (Digital Versatile Disk), a DVD-RAM (Random Access Memory), and a CD-ROM (Compact Disk Read Only Memory), and a CD-R (Recordable)/RW (ReWritable). Further, the magneto-optical recording medium includes e.g. an MO (Magneto-Optical disk).

To make the program available on the market, portable recording media, such as DVD and CD-ROM, which store the program, are sold. Further, the program can be stored in a storage device of a server computer connected to a network, and transferred from the server computer to another computer via the network.

When the access rights management program is executed by a computer, the program stored e.g. in a portable recording medium or transferred from the server computer is stored in a storage device of the computer. Then, the computer reads the program from the storage device of its own and executes processing based on the program. The computer can also read the program directly from the portable recording medium and execute processing based on the program. Further, the computer may also execute processing based on a program which is transferred from the server computer whenever the processing is to be carried out.

According to the present invention, a distributor who distributes an electronic document to a primary distributee need not specify end distributees. Therefore, it is possible to reduce burden on the distributor. Further, the primary distributee can specify a specific distributee of the electronic document within a range of secondary distributees, for permitting the specific distributee to use the electronic document, without consulting the distributor. The specific distributee is permitted to use the electronic document within the scope of use rights granted to the specific distributee. This makes it possible to easily and reliably suppress or prevent leakage of the electronic document. These advantageous features of the present invention make it possible to safely manage the use of the electronic document with ease and efficiency.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A Non-transitory computer-readable recording medium storing an access rights management program for managing access rights to an electronic document, the access rights management program causing a computer to execute a process comprising:
    storing a first access policy containing information on a first distributee to which the electronic document is distributed, and information on second distributees to which the first distributee is permitted to distribute the electronic document, as well as information on use rights that permit the second distributees to use the electronic document with a defined scope of authority;
    storing distribution target information indicative of the second distributees; confirming, in response to a distributee specifying request from the first distributee which requests permission to grant the use rights to a specific distributee that the first distributee has selected based on the information on the second distributees which is contained in the first access policy, whether the specific distributee is included in the second distributees, by referring to the distribution target information;
    registering a second access policy that the first distributee has set for the specific distributee by further limiting the use rights granted to the second distributees in the first access policy, when said confirming has confirmed that the specific distributee is included in the second distributees; and
    permitting, with reference to the second access policy, the specific distributee to use the electronic document using the use rights, when a use request for permission of use of the electronic document is received from the specific distributee.

2. The non-transitory computer-readable recording medium according to claim 1, wherein when the use request is received, said permitting confirms whether or not the use is within a scope of the use rights, and if it is determined that the use is within the scope of the use rights, said permitting permits the specific distributee to use the electronic document using the use rights.

3. The non-transitory computer-readable recording medium according to claim 1, wherein the first access policy contains use rights that permit the first distributee to use the electronic document with a defined scope of authority.

4. The non-transitory computer-readable recording medium according to claim 1, wherein:
    the distributee specifying request contains information indicative of a desired range of use of the electronic document;
    when the distributee specifying request is received, said confirming confirms whether or not the desired range of use is within a scope of the use rights defined by the first access policy, and
    if it is determined that the desired range of use is within the scope of the use rights defined by the first access policy, said registering registers the second access policy.

5. The non-transitory computer-readable recording medium according to claim 1, wherein:
    the first access policy contains access policy-setting rights for authorizing the first distributee to permit or inhibit use of the electronic document by the second distributes;
    the process further comprises confirming whether or not the access policy-setting rights are granted to the first distributee, when the distributee specifying request is received; and
    said registering registers the second access policy when it is determined that the access policy-setting rights are granted to the first distributee.

6. The non-transitory computer-readable recording medium according to claim 5, wherein:
    the first access policy contains use rights that permit the first distributee to use the electronic document with a defined scope of authority, and
    the process further comprises granting the second distributees use rights equivalent to the use rights set for the first distributee, when it is determined that the access policy-setting rights are granted to the first distributee.

7. The non-transitory computer-readable recording medium according to claim 1, wherein the process further comprises authenticating whether or not the distributee specifying request is from the first distributee and whether or not the use request is from the specific distributee.

8. The non-transitory computer-readable recording medium according to claim 1, the process further comprising:
    storing, upon receipt of an encryption key used in encrypting the electronic document, the encryption key in association with the first access policy;
    reading the use rights and the encryption key when said permitting permits the specific distributee to use the electronic document using the use rights; and
    sending a client the use rights and the encryption key which have been read.

9. A method of managing access rights to an electronic document, comprising:
- storing a first access policy containing information on a first distributee to which the electronic document is distributed, and information on second distributees to which the first distributee is permitted to distribute the electronic document, as well as information on use rights that permit the second distributees to use the electronic document with a defined scope of authority;
- storing distribution target information indicative of the second distributees;
- confirming, in response to a distributee specifying request from the first distributee which requests permission to grant the use rights to a specific distributee that the first distributee has selected based on the information on the second distributees which is contained in the first access policy, whether the specific distributee is included in the second distributees, by referring to the distribution target information;
- registering a second access policy that the first distributee has set for the specific distributee by further limiting the use rights granted to the second distributees in the first access policy, when said confirming has confirmed that the specific distributee is included in the second distributees; and
- permitting, with reference to the second access policy, the specific distributee to use the electronic document using the use rights, when a use request for permission of use of the electronic document is received from the specific distributee.

10. An access rights management apparatus for managing access rights to an electronic document, comprising:
- access policy-storing means for storing a first access policy containing information on a first distributee to which the electronic document is distributed, and information on second distributees to which the first distributee is permitted to distribute the electronic document, as well as information on use rights that permit the second distributees to use the electronic document with a defined scope of authority;
- storage means for storing distribution target information indicative of the second distributees;
- access policy-confirming means for confirming, in response to a distributee specifying request from the first distributee which requests permission to grant the use rights to a specific distributee that the first distributee has selected based on the information on the second distributees which is contained in the first access policy, whether the specific distributee is included in the second distributees, by referring to the distribution target information;
- registration means for registering, in said access policy-storing means, a second access policy that the first distributee has set for the specific distributee by further limiting the use rights granted to the second distributees in the first access policy, when said access policy-confirming means has confirmed that the specific distributee is included in the second distributees; and
- use rights-confirming means for permitting, with reference to the second access policy, the specific distributee to use the electronic document using the use rights, when a use request for permission of use of the electronic document is received from the specific distributee.

11. An access rights management apparatus for managing access rights to an electronic document, comprising:
- an access policy storing section configured to store a first access policy containing information on a first distributee to which the electronic document is distributed, and information on second distributees to which the first distributee is permitted to distribute the electronic document, as well as information on use rights that permit the second distributees to use the electronic document with a defined scope of authority;
- a storage section configured to store distribution target information indicative of the second distributees;
- an access policy confirming section configured to confirm, in response to a distributee specifying request from the first distributee which requests permission to grant the use rights to a specific distributee that the first distributee has selected based on the information on the second distributees which is contained in the first access policy, whether the specific distributee is included in the second distributees, by referring to the distribution target information;
- a registration section configured to register, in said access policy storing section, a second access policy that the first distributee has set for the specific distributee by further limiting the use rights granted to the second distributees in the first access policy, when said access policy confirming section has confirmed that the specific distributee is included in the second distributees; and
- a use rights confirming section configured to permit, with reference to the second access policy, the specific distributee to use the electronic document using the use rights, when a use request for permission of use of the electronic document is received from the specific distributee.

* * * * *